United States Patent
Lee et al.

(10) Patent No.: US 6,812,480 B2
(45) Date of Patent: Nov. 2, 2004

(54) TRIODE STRUCTURE FIELD EMISSION DISPLAY DEVICE USING CARBON NANOTUBES AND METHOD OF FABRICATING THE SAME

(75) Inventors: Hang-woo Lee, Kyungki-do (KR); Sang-jin Lee, Kyungki-do (KR); Shang-hyeun Park, Chungcheongnam-do (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/347,622

(22) Filed: Jan. 22, 2003

(65) Prior Publication Data

US 2003/0141495 A1 Jul. 31, 2003

(30) Foreign Application Priority Data

Jan. 22, 2002 (KR) .......................................... 2002-3687

(51) Int. Cl.[7] .............................. H01L 21/00; H01J 1/30
(52) U.S. Cl. ........................... 257/10; 438/20; 313/309; 313/310; 313/336; 313/351; 445/49; 445/50; 445/51
(58) Field of Search ............................ 257/10; 438/20; 313/309, 310, 336, 351; 445/49–51

(56) References Cited

U.S. PATENT DOCUMENTS 6,448,701 B1 * 9/2002 Hsu ............................ 313/309
6,670,629 B1 * 12/2003 Wilson ........................ 257/10
6,737,792 B2 * 5/2004 Saito et al. .................. 313/310

FOREIGN PATENT DOCUMENTS

| EP | 1 111 647 A2 | 6/2001 |
| EP | 1 221 710 A2 | 7/2002 |
| JP | 2000-348600 A | 12/2000 |
| JP | 2000-353466 A | 12/2000 |
| JP | 2000-353467 A | 12/2000 |
| JP | 2001-167690 A | 6/2001 |

* cited by examiner

*Primary Examiner*—Bradley Baumeister
(74) *Attorney, Agent, or Firm*—Burns, Doane, Swecker & Mathis, L.L.P.

(57) ABSTRACT

A field emission display device and a method of fabricating the same are provided. The field emission display device includes a substrate, a transparent cathode layer, an insulation layer, a gate electrode, a resistance layer, and carbon nanotubes. The transparent cathode layer is deposited on the substrate. The insulation layer is formed on the cathode layer and has a well exposing the cathode layer. The gate electrode is formed on the insulation layer and has an opening corresponding to the well. The resistance layer is formed to surround the surface of the gate electrode and the inner walls of the opening and the well so as to block ultraviolet rays. The carbon nanotube field emitting source is positioned on the exposed cathode layer. An alignment error between the gate electrode and the cathode is removed, and carbon nanotube paste is prevented from remaining during development, thereby preventing current leakage and short circuit between the electrodes and diode emission. Accordingly, the performance of the field emission display device can be improved.

7 Claims, 25 Drawing Sheets

TRIODE STRUCTURE FIELD EMISSION DISPLAY DEVICE USING CARBON NANOTUBES AND METHOD OF FABRICATING THE SAME

CROSS-REFERENCE TO RELATED APPLICATIONS

This application claims the priority of Korean Patent Application No. 2002-3687, filed on Jan. 22, 2002, which is incorporated herein in its entirety by reference.

BACKGROUND OF THE INVENTION

1. Field of the Invention

The present invention relates to a field emission display device having carbon nanotubes and a method of fabricating the same, and more particularly, to a field emission display device in which an alignment error between a gate electrode and a cathode electrode due to high-temperature firing does not occur, and a method of fabricating the same.

2. Description of the Related Art

Display apparatuses used for personal computers (PCs) and television receivers include cathode-ray tubes, liquid crystal displays (LCDs), plasma display panels (PDPs), and field emission displays (FEDs), which use high-speed thermionic emission.

FEDs using carbon nanotubes is much more advantageous than cathode-ray tubes in a wide view angle, high resolution, low power, and temperature stability. Such FEDs can be applied to various fields such as car navigation apparatuses and view finders of electronic video equipment. Particularly, FEDs can be used as alterative display apparatuses for PCs, personal data assistants (PDAs), medical instruments, high definition television (HDTV), and so on.

FIG. 1 is a diagram showing the structure of a conventional field emission display device. Referring to FIG. 1, the conventional field emission display device includes a substrate 1; an indium tin oxide (ITO) electrode layer 2 formed on the substrate 1; a mask cathode layer 3 formed on the ITO electrode layer 2 such that the ITO electrode layer 2 is partially exposed; an insulation layer 5 formed on the mask cathode layer 3 such that a well 8 is formed; a gate electrode 6 formed in the shape of a strip on the insulation layer 5; and an electron emitting source 31 including carbon nanotubes formed on the ITO electrode layer 2 exposed at the bottom of the well 8.

FIGS. 2A through 2J are diagrams showing the stages in a procedure of forming a triode structure before printing carbon nanotube paste in a conventional method of fabricating a field emission display device.

As shown in FIG. 2A, the ITO electrode layer 2 is formed on the substrate 1, and the mask electrode layer 3 is deposited on the ITO electrode layer 2. The substrate 1 is made of glass, and the mask cathode layer 3 is made of a material such as a metal or amorphous silicon which blocks ultraviolet rays.

As shown in FIG. 2B, photoresist 11-1 is deposited on the mask cathode layer 3; a mask 71-1 is disposed above the mask cathode layer 3; and ultraviolet rays are radiated for exposure. After exposure, etching and cleaning are performed, thereby forming a hole 4 in the mask electrode layer 3, as shown in FIG. 2C.

As shown in FIG. 2D, the insulation layer 5 is formed on the mask cathode layer 3 and is then fired at a temperature higher than 550° C. for an insulation characteristic. Thereafter, the gate electrode 6 is deposited on the insulation layer 5, as shown in FIG. 2E.

FIG. 2F shows a photoprocess including exposure, development, etching, and cleaning for patterning the gate electrode 6. Reference numeral 71-2 denotes a mask, and reference numeral 11-2 denotes photoresist. If the photoprocess is completed, the gate electrode 6 having a hole 7, as shown in FIG. 2G. Thereafter, wet or dry etching is performed to etch the insulation layer 5 and the mask cathode layer 3, thereby forming the well 8 such that the ITO cathode layer 2 is partially exposed at the bottom of the well 8, as shown in FIG. 2H.

As shown in FIG. 2I, after photoresist 11-3 is deposited and a mask 71-3 is disposed, a photoprocess is performed, thereby patterning the gate electrode 6 in the shape of a strip, as shown in FIG. 2J.

In the above-described conventional method of fabricating a field emission display device, the substrate 1 made of glass may be deformed by the heat during high-temperature firing, so an alignment mark may be displaced. Due to displacement of the alignment mark, the center of the hole 4 of the mask cathode layer 3 does not exactly meet the center of the well 8 after the gate electrode 6 is deposited and patterned, as shown in FIG. 2I. As a result, the electron emitting source 31 is displaced from the center of the well 8 to the right or left. Due to an alignment error between the gate electrode 6 and the electron emitting source 31, the gate electrode 6 may become in contact with or very close to the ITO cathode layer 2, resulting in current leak or a decrease in the amount of electrons emitted.

FIGS. 2K through 2Q are diagrams showing the stages in a procedure of making carbon nanotubes into an electron emitting source in the triode structure formed by the procedure including the stages shown in FIGS. 2A through 2J in the conventional method.

In injecting carbon nanotube paste into the well 8, a lift-off method using a sacrificial layer, a method of performing direct alignment and injecting carbon nanotube paste, or a rear exposure method can be used. When the method of performing direct alignment and injecting carbon nanotube paste is used, it is difficult to achieve a high aspect ratio due to an alignment error in equipment and viscosity of a carbon nanotube material. In the rear exposure method, since a sacrificial layer is not used, a large amount of residues are produced.

Accordingly, a lift-off process using photoresist as a sacrificial layer is generally used, as shown in FIGS. 2K through 2Q, in fabricating an electron emitting source using carbon nanotube paste.

Referring to FIG. 2K, photoresist 11-4 is deposited on the substrate 1 having a triode structure shown in FIG. 2J such that the well 8, the insulation layer 5, and the gate electrode 6 are covered with the photoresist 11-4. Thereafter, a photoprocess is performed, thereby etching the photoresist 11-4 only formed in the well 8, except for the photoresist 11-4 formed on the insulation layer 5 and the gate electrode 6, as shown in FIG. 2I.

After the etching step, as shown in FIG. 2M, carbon nanotube paste 12 is injected into the well 8 by a screen printing method and is deposited on the entire surface of the photoresist 11-4, and then rear exposure is performed. Here, the photoresist 11-4 is used as a sacrificial layer.

If the rear exposure is completed, as shown in FIG. 2N, the carbon nanotube paste 12 is divided into exposed carbon nanotube paste 13 and non-exposed carbon nanotube paste 13'. This happens because the carbon nanotube paste 13' positioned in front the mask cathode layer 3 is not exposed to ultraviolet rays.

Thereafter, development using a developer such as acetone or $Na_2CO_3$ (0.4% wt) is performed. As a result, the exposed carbon nanotube paste 13 remains, but the non-exposed carbon nanotube paste 13' is lifted off simultaneously with diffusion of the photoresist 11-4 as a sacrificial layer to the developer, so carbon nanotube paste 14 having a shape shown in FIG. 2O can be obtained. Here, residue 14' of the non-exposed carbon nanotube paste 13' may not dissolves in the developer, or some of the exposed carbon nanotube paste 13 may be exposed to the developer, so carbon nanotube paste may adhere to the gate electrode 6 or the insulation layer 5.

Thereafter, the resultant structure shown in FIG. 2O is fired at a nitrogen atmosphere at a high temperature of about 460° C., thereby shrinking the carbon nanotube paste 14 to form a shrunken carbon nanotube paste 15, as shown in FIG. 2P. Then, the surface of the carbon nanotube paste 15 is mechanically processed to reveal carbon nanotubes sunken into the carbon nanotube paste 15, thereby forming the electron emitting source 31, as shown in FIG. 2Q. The residue 14' still remains.

The residue 14' may adhere to the surface of the triode structure, as shown in FIG. 2O, causing a defect such as a short circuit between electrodes or a diode emission due to positive voltage.

FIG. 3 shows an alignment error between the gate electrode 6 and the electron emitting source 31 in a field emission display device fabricated according to a conventional method shown in FIG. 2D. In FIG. 3, the electron emitting source 31 is displaced from the center of the gate electrode 6 to the right.

SUMMARY OF THE INVENTION

The present invention provides a field emission display device in which a short circuit can be prevented from occurring between a gate electrode and a cathode by removing an alignment error between the gate electrode and the carbon nanotubes which may occur during a high-temperature firing process.

The present invention also provides a method of fabricating a field emission display device, through which a carbon nanotube residue, which may cause a short circuit between electrode and diode emission, is prevented from being produced during a carbon nanotube paste development process.

According to an aspect of the present invention, there is provided a field emission display device including a substrate; a transparent cathode layer which is deposited on the substrate; an insulation layer which is formed on the cathode layer and has a well exposing the cathode layer; a gate electrode which is formed on the insulation layer and has an opening corresponding to the well; a resistance layer which is formed to surround the surface of the gate electrode and the inner walls of the opening and the well so as to block light; and a carbon nanotube field emitting source which is positioned on the exposed cathode layer.

Here, it is preferable that the resistance layer is made of amorphous silicon.

According to another aspect of the present invention, there is provided a method of fabricating a field emission display device. The method includes (a) forming a transparent cathode layer and an insulation layer on a substrate and performing firing; (b) forming a gate electrode on the insulation layer and patterning the gate electrode to form an opening at the center thereof; (c) etching the insulation layer to form a well corresponding to the opening and patterning the gate electrode in a strip shape; (d) depositing a resistance layer for blocking light on the surface of the gate electrode and the inner wall of the well and patterning the resistance layer to expose the cathode layer at the bottom of the well; and (e) forming a carbon nanotube field emitting source on the exposed cathode layer.

Preferably, the resistance layer is formed of amorphous silicon, and the resistance layer is formed by chemical vapor deposition.

According to still another aspect of the present invention, there is provided a method of fabricating a field emission display device which has a triode-structure composed of an cathode layer formed on a substrate, an insulation layer formed on the cathode layer such as to have a well, and a gate electrode formed on the insulation layer such as to have an opening corresponding to the well. The method includes (a) depositing a protective layer such as to surround the insulation layer and the gate electrode and patterning the protective layer such that the protective layer remains only on the tops of the insulation layer and the gate electrode; (b) depositing carbon nanotube paste such as the carbon nanotube paste covers the protective layer and fills the well and the opening; (c) radiating light at the rear of the substrate to expose the carbon nanotube paste and the protective layer to the light and performing development to lift off non-exposed carbon nanotube paste and the protective layer, thereby forming a carbon nanotube column; and (d) firing the carbon nanotube column to lower it and performing surface treatment, thereby forming a field emitting source in which carbon nanotube tips protrude from the surface of the carbon nanotube column.

Preferably, the protective layer is a dry film release (DFR) film.

In step (c), the carbon nanotube paste and the protective layer are simultaneously lifted off. Alternatively, the non-exposed carbon nanotube paste is first removed using a developer, and then the protective layer is lifted off.

The carbon nanotube paste and the protective layer are simultaneously lifted off using a solution of sodium hydroxide.

When the carbon nanotube paste is first removed, preferably, the carbon nanotube paste is removed using a solution of $Na_2CO_3$, and then the protective layer is removed using a solution of sodium hydroxide.

The present invention removes an alignment error between a gate electrode pattern and a cathode pattern, which may occur during a high-temperature firing process in fabricating a field emission display device, thereby preventing short circuit between the gate electrode and the cathode.

In addition, the present invention provides a method of fabricating a field emission display device, in which a protective layer is formed to protect the surface of the cathode and prevent carbon nanotube paste from being remaining during development of the carbon nanotube paste, thereby suppressing short circuit between electrodes and electron emission of an anode.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
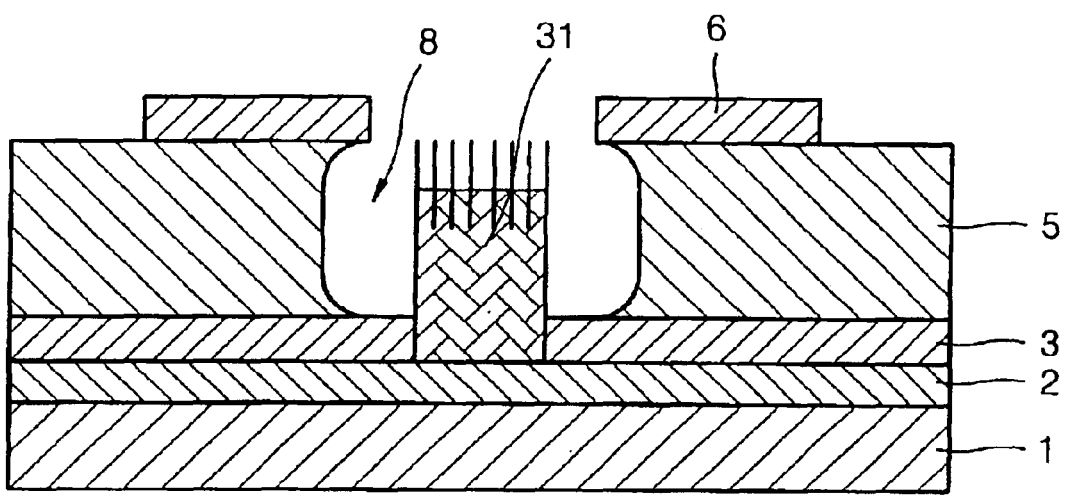
FIG. 1 is a diagram of a conventional field emission display device.

Hereinafter, a field emission display device and a method of fabricating the same according to embodiments of the present invention will be described in detail with reference to the attached drawings. The same reference numerals in different drawings represent the same element.

Figure 4:
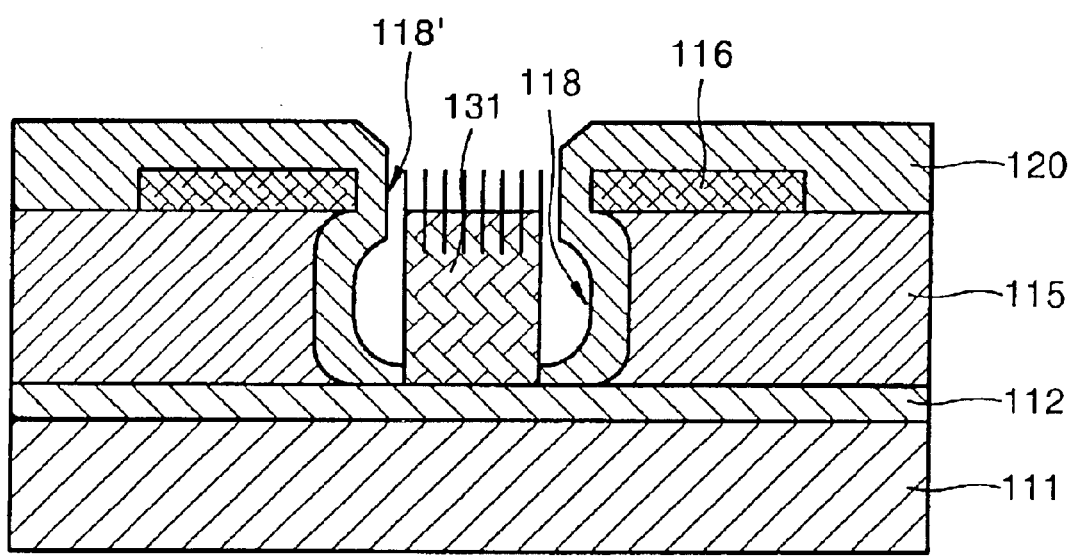
FIG. 4 is a diagram of a field emission display device according to an embodiment of the present invention.

FIG. 4 is a sectional view of a field emission display device according to an embodiment of the present invention. Referring to FIG. 4, a cathode layer 112 is formed on a substrate 111, and an insulation layer 115 having a well 118 is formed on the cathode layer 112. A strip gate electrode 116 having an opening 118' expended from the well 118 is patterned on the insulation layer 115. A resistance layer 120 is formed to surround the gate electrode 116 and the well 118. The cathode layer 112 is partially exposed at the bottom of the well 118, and an electron emitting source 131 including a carbon nanotube column and carbon nanotube tips protruding from the carbon nanotube column is formed on the exposed cathode layer 112.

Figure 5A:
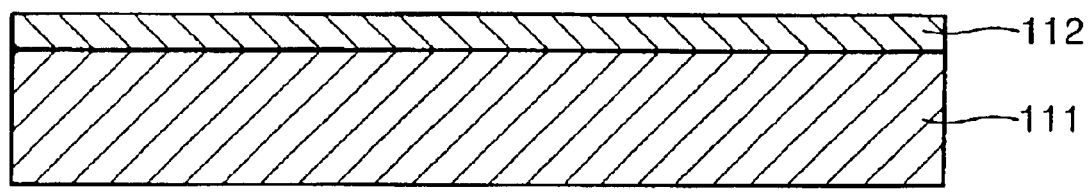
FIGS. 5A through 5R are diagrams of a method of fabricating a field emission display device according to a first embodiment of the present invention.
Figure 5B:
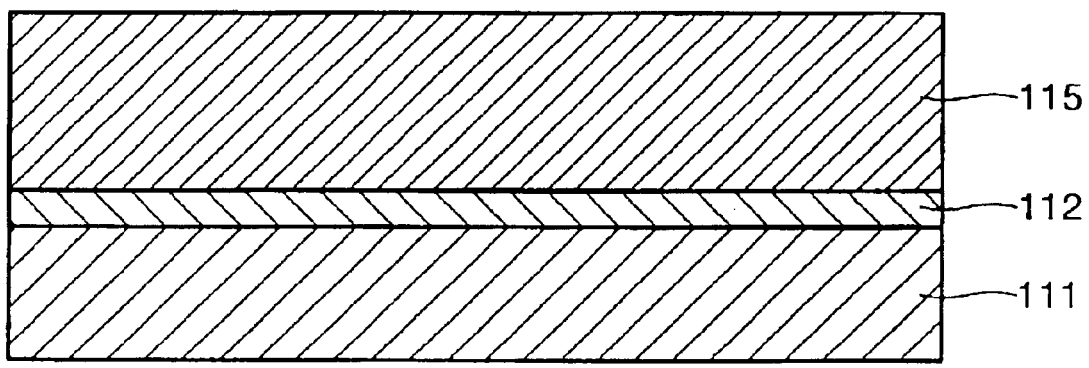
Figure 5C:
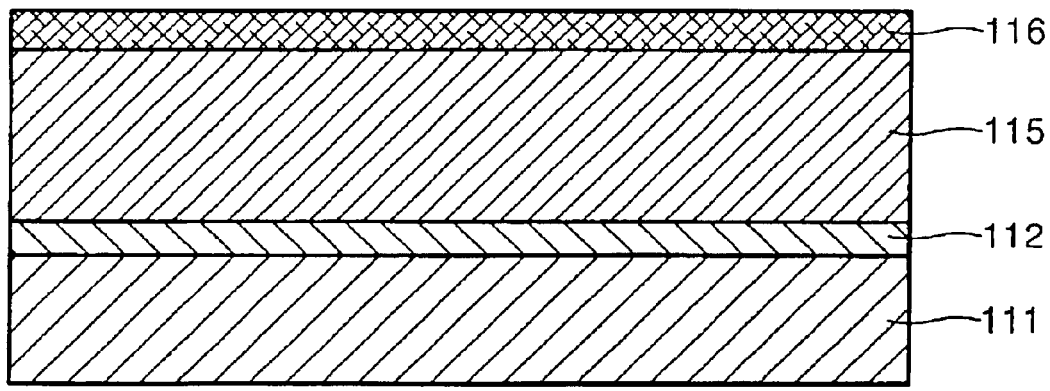
Figure 5D:
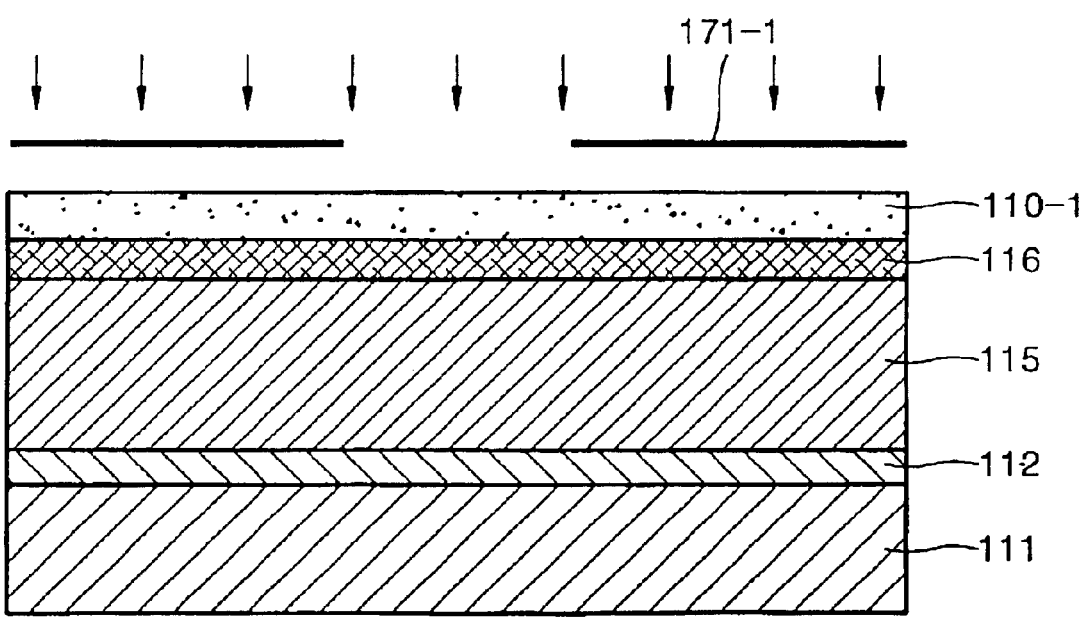
Figure 5E:
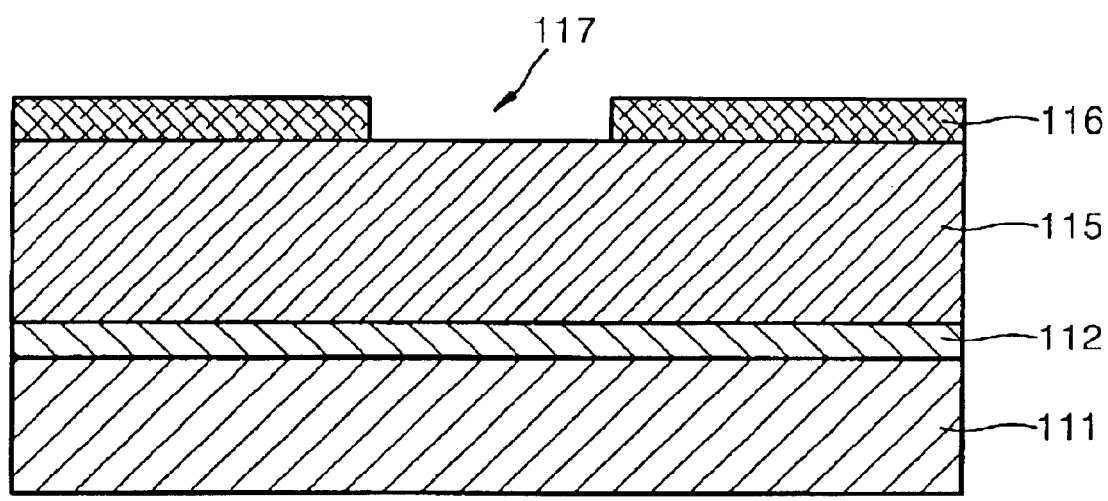
Figure 5F:
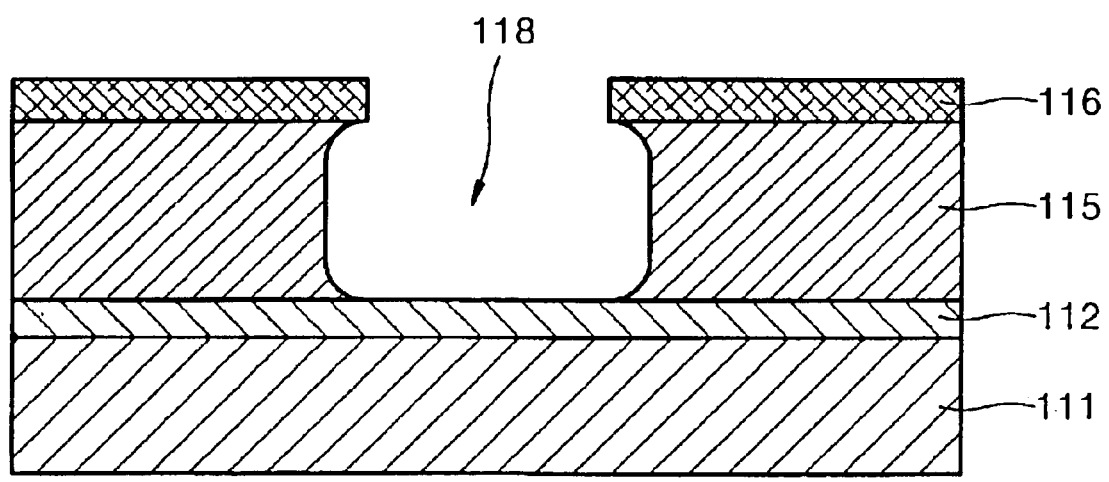
Figure 5G:
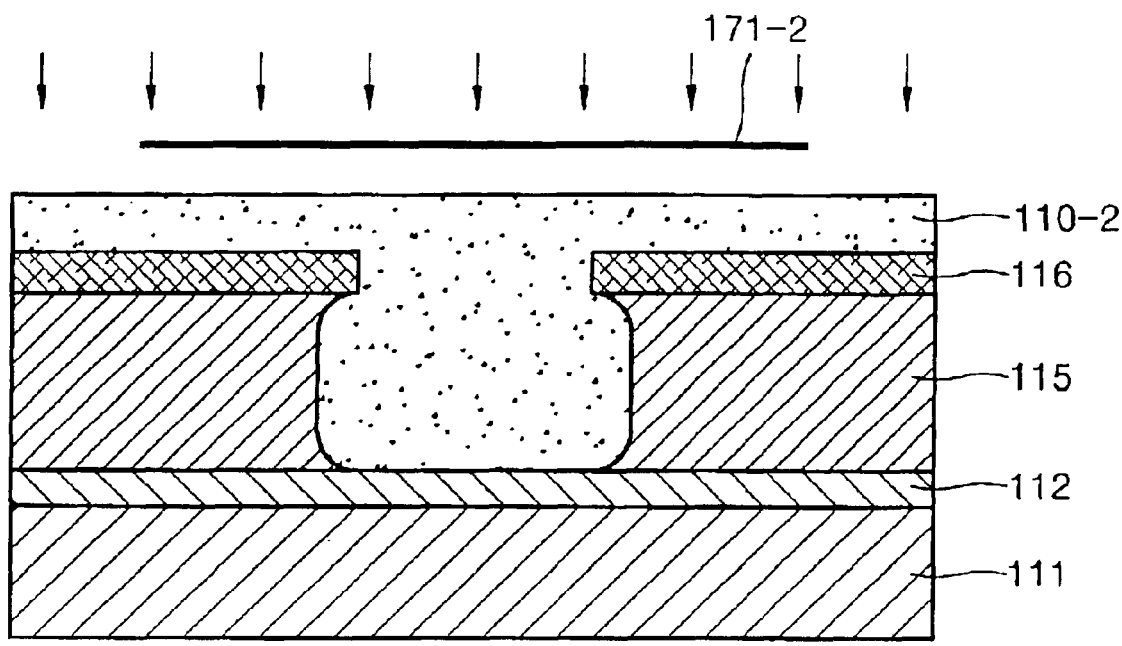
Figure 5H:
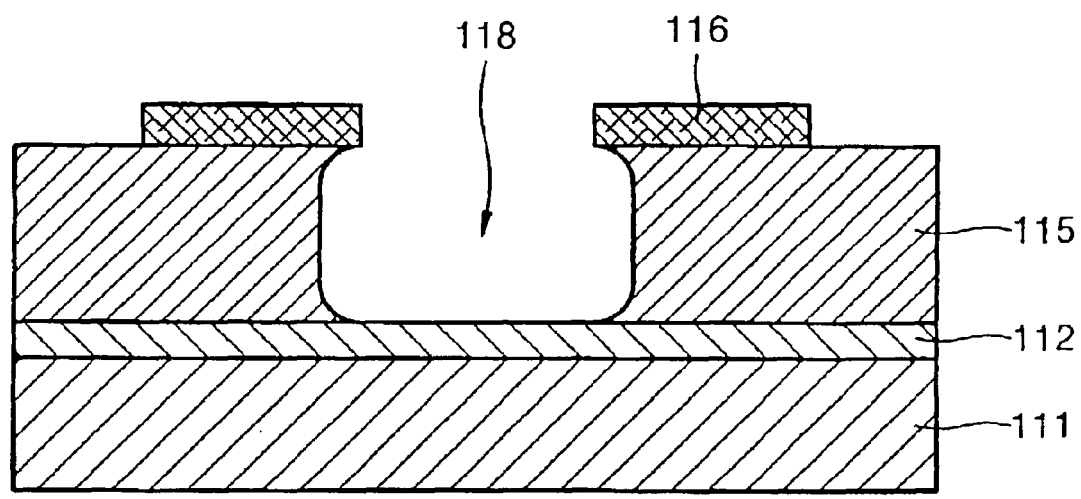
Figure 5I:
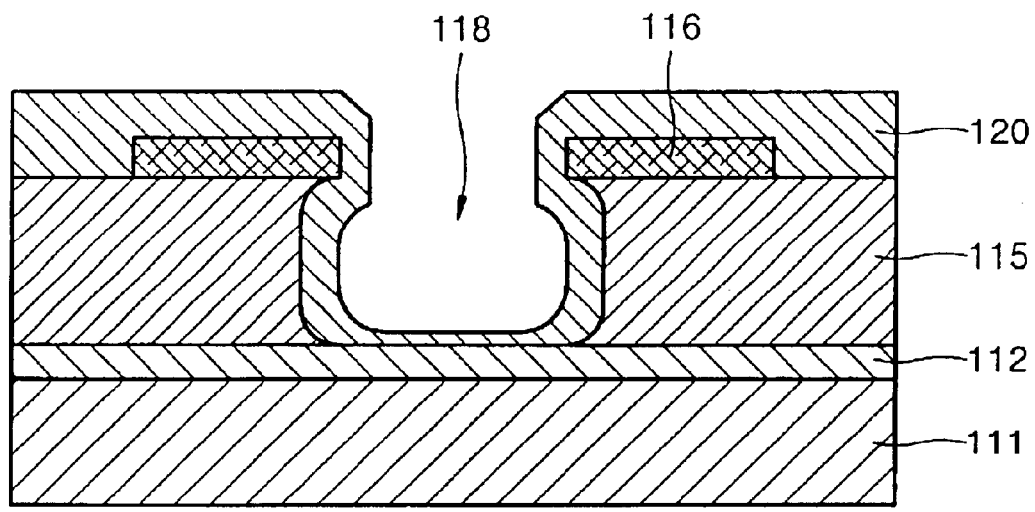
Figure 5J:
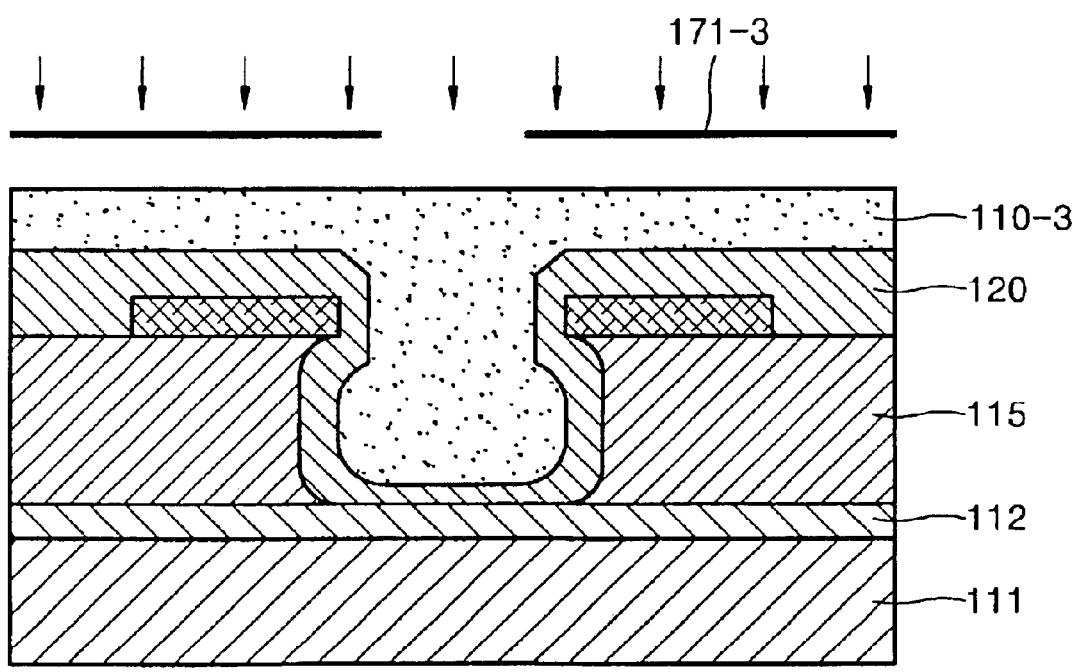
Figure 5K:
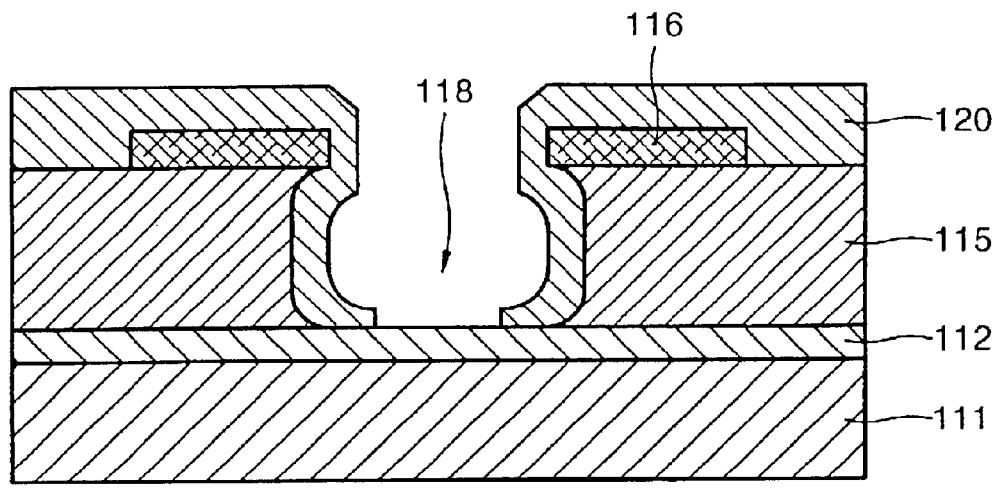
Figure 5L:
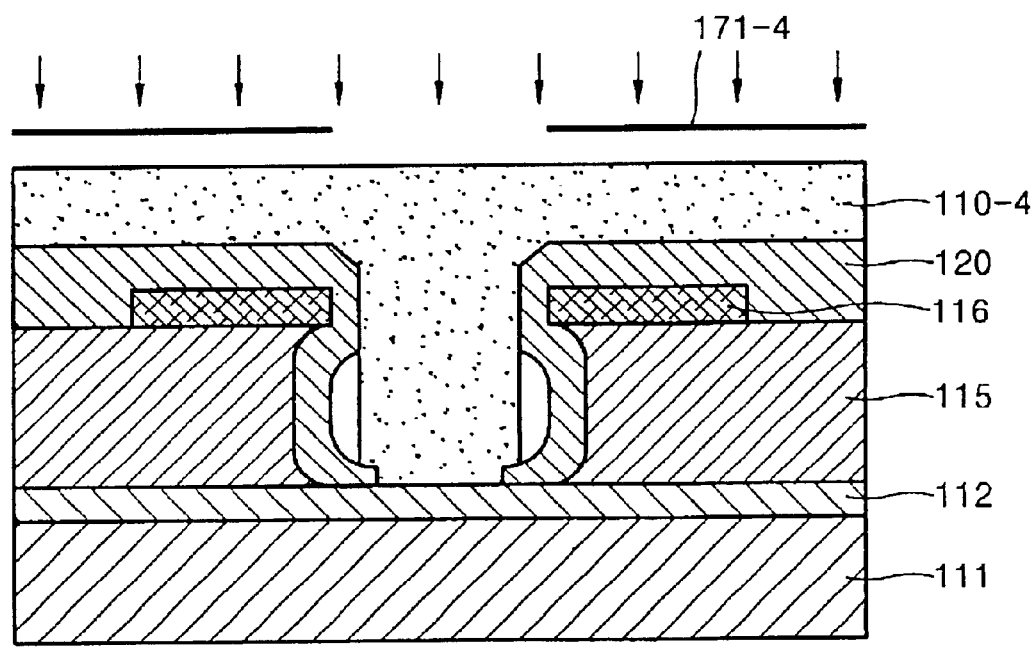
Figure 5M:
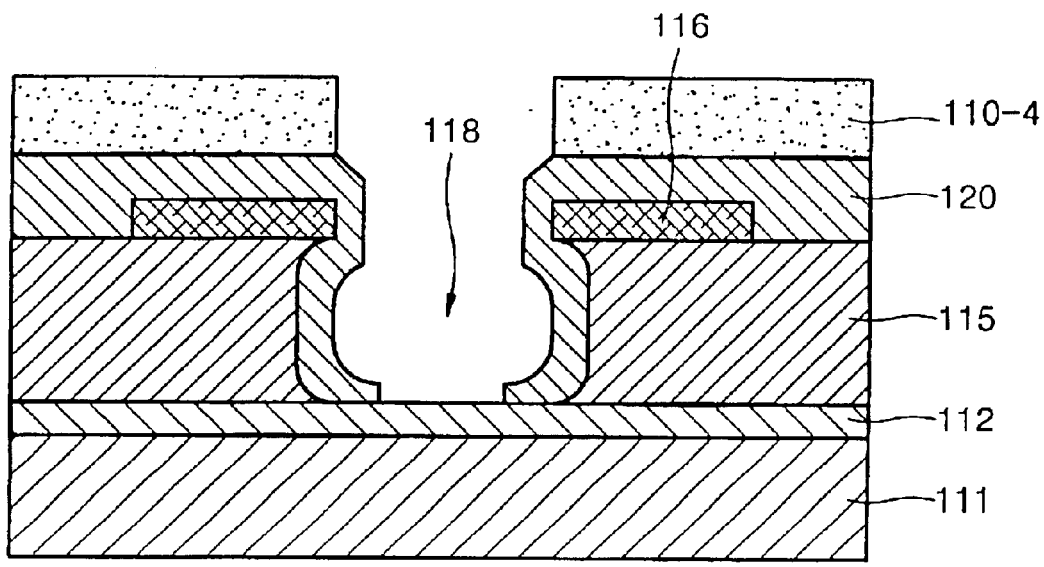
Figure 5N:
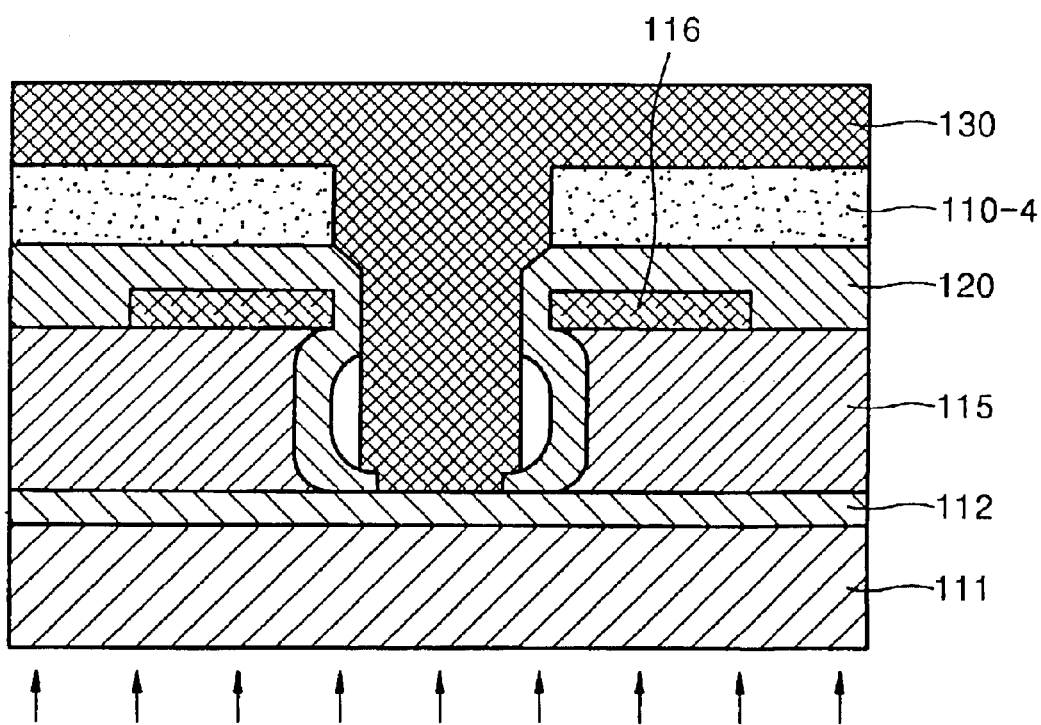
Figure 5O:
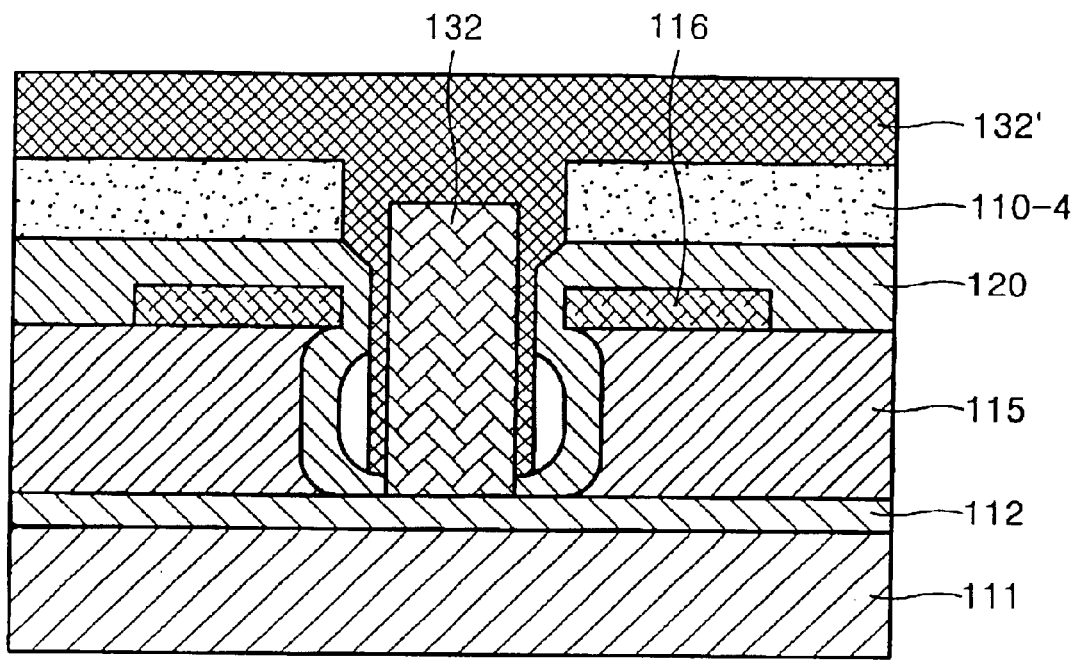
Figure 5P:
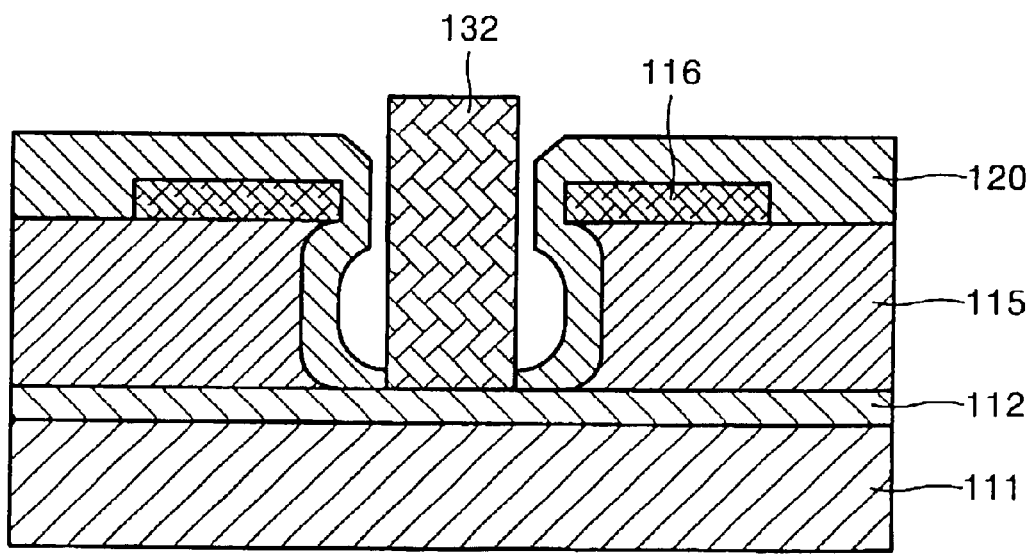
Figure 5Q:
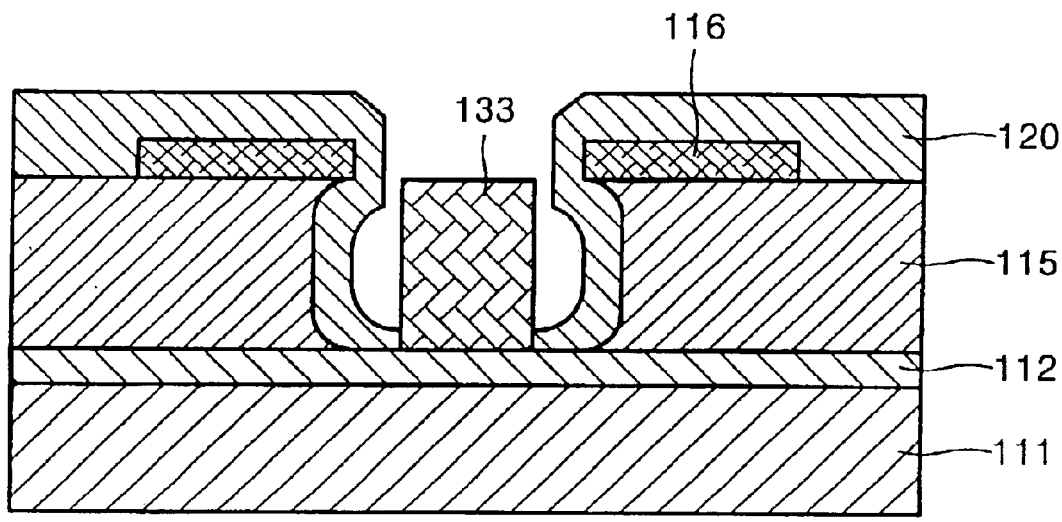
Figure 5R:
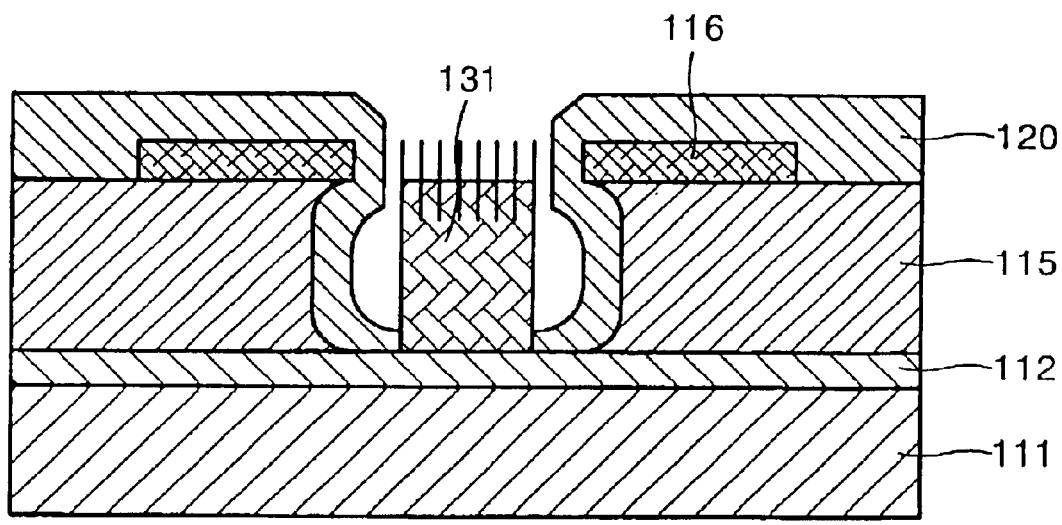

FIGS. 5A through 5R are diagrams of a method of fabricating the field emission display device shown in FIG. 4 according to a first embodiment of the present invention.

As shown in FIG. 5A, the cathode layer 112 of indium tin oxide (ITO) is deposited on the substrate 111. As described above, the cathode layer 112 is formed of a transparent conductive material for rear exposure.

Next, as shown in FIG. 5B, the insulation layer 115 is deposited on the cathode layer 112, and firing is performed at high temperature over 550° C. Unlike a conventional method of fabricating a field emission display device, in the first embodiment of the present invention, a mask cathode layer is removed; immediately the insulation layer 115 is deposited on the cathode layer 112; and a firing process is performed before forming a cathode pattern. Accordingly, an alignment error between the cathode pattern and a gate electrode pattern does not occur.

After the firing process, as shown in FIG. 5C, the gate electrode 116 is formed on the insulation layer 115. Thereafter, as shown in FIG. 5D, photoresist 110-1 is deposited on the gate electrode 116; a mask 117-1 is disposed on the photoresist 110-1; and the same photoprocess including exposure as that described above is performed, thereby forming a gate pattern having a hole 117, as shown in FIG. 5E. The insulation layer 115 corresponding to the hole 117 is etched, as shown in FIG. 5F, thereby forming a well 118 in which carbon nanotube paste will be printed later.

FIG. 5G shows a photoprocess including exposure, development, etching, and cleaning in order to make the gate electrode 116 into a pattern having a strip shape. Reference numeral 110-2 denotes photoresist, and reference numeral 171-2 denotes a mask. The pattern of the gate electrode 116 formed by the photoprocess is shown in FIG. 5H.

Then, as shown in FIG. 5I, a material such as amorphous silicon which has resistance and blocks ultraviolet rays is deposited to surround the gate electrode 116 and the well 118, thereby forming a resistance layer 120 blocking ultraviolet rays. The resistance layer 120 is formed using a chemical vapor deposition (CVD) method which is convenient for step coverage.

Next, as shown in FIG. 5J, photoresist 110-3 is deposited, and a mask 171-3 is disposed on the photoresist 110-3. Thereafter, a photoprocess including exposure and development is performed, thereby exposing the cathode layer 112 at the bottom of the well 118, as shown in FIG. 5K. Subsequently, as shown in FIG. 5L, photoresist 110-4 is deposited on the entire surface of the substrate 111 including the well 118 and the resistance layer 120, and a mask 171-4 is disposed on the photoresist 110-4. Then, a photoprocess is performed, thereby patterning the photoresist 110-4 having a shape shown in FIG. 5M.

As shown in FIG. 5M, the photoresist 110-4 is removed from the well 118 and the surface of the cathode layer 112 exposed at the bottom of the well 118 and remains only on the resistance layer 120 blocking ultraviolet rays.

Referring to FIG. 5N, carbon nanotube paste 130 is injected into the well 118 and is deposited to cover the photoresist 110-4. Then, ultraviolet rays are radiated at the rear of the substrate 111 to expose the carbon nanotube paste 130. As a result, the carbon nanotube paste 130 is divided into exposed carbon nanotube paste 132 and non-exposed carbon nanotube paste 132' due to the resistance layer 120 blocking ultraviolet rays, as shown in FIG. 5O.

Thereafter, development is performed, thereby removing the non-exposed carbon nanotube paste 132' and leaving the exposed carbon nanotube paste 132 in the form of a column, as shown in FIG. 5P. Then, a firing process is performed, thereby lowering the exposed carbon nanotube column 133, as shown in FIG. 5Q. Next, a surface process is performed on the exposed carbon nanotube column 133, thereby forming the electron emitting source 131 with arranged carbon nanotube tips having a needle shape, as shown in FIG. 5R.

Figure 3:
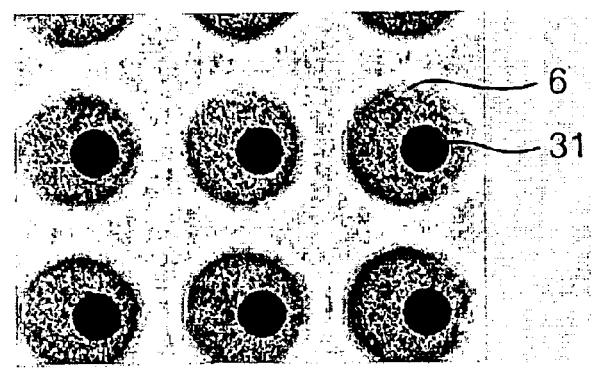
FIG. 3 is a photograph of a field emission display device fabricated by the conventional method shown in FIGS. 2A through 2Q.
Figure 6:
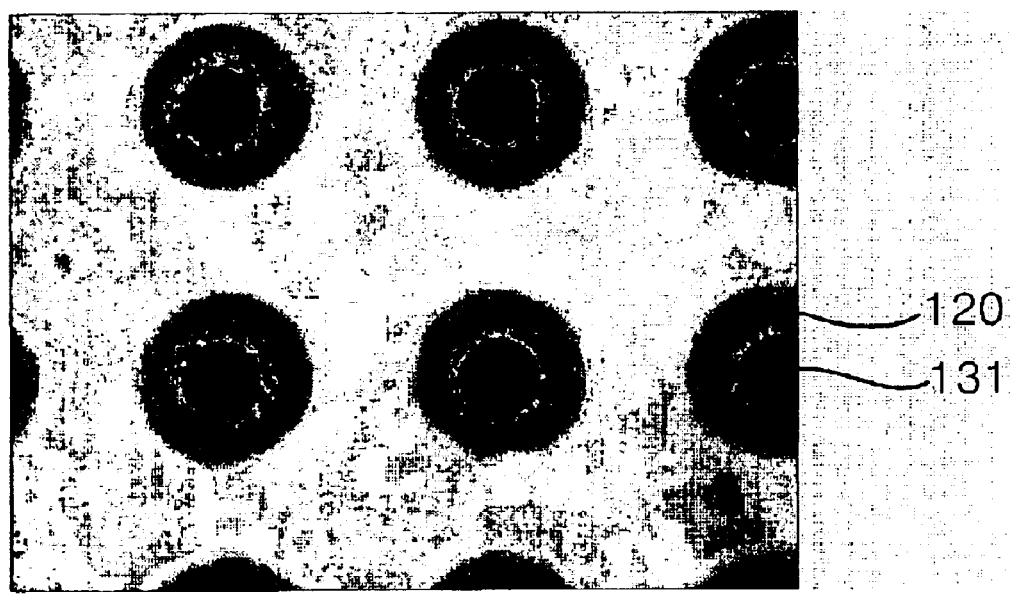
FIG. 6 is a photograph of a field emission display device fabricated by a method of fabricating a field emission display device according to the first embodiment of the present invention.

FIG. 6 is a photograph of a field emission display device fabricated by a method of fabricating a field emission display device according to the first embodiment of the present invention. Unlike the conventional field emission display device shown in FIG. 3, the electron emitter source 131 and the resistance layer 120 are correctly positioned without having an alignment error.

A method of fabricating a field emission display device according to the first embodiment of the present invention removes an alignment error between a gate electrode pattern and a cathode pattern, which may occur during a high-temperature firing process in fabricating a large field emission display device, thereby preventing electrical short circuit between a gate electrode and a cathode which occurs due to electrons emitted from carbon nanotubes. However, when rear exposure is performed using liquid photoresist as a sacrificial layer and lift-off is performed as in a conventional method, residue of exposed or non-exposed carbon nanotube paste may be produced and may result in a fault such as short circuit between electrodes or emission of electrons due to a positive voltage.

In order to overcome this problem, a method of fabricating a field emission display device according to a second embodiment of the present invention is provided. In the second embodiment, a protective layer is formed on the surface of a cathode in order to prevent performance from being deteriorated due to residue, which is produced during development of carbon nanotube paste.

FIGS. 7A through 7H are diagrams of a method of fabricating a field emission display device according to the second embodiment of the present invention.

Figure 2A:
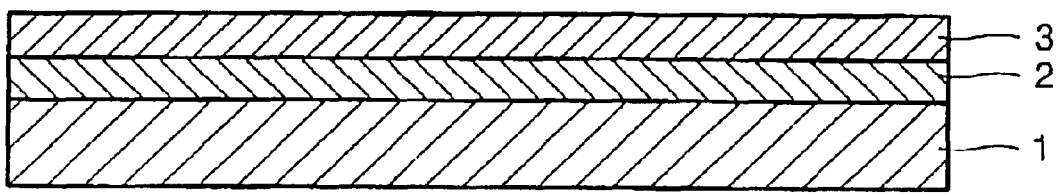
FIGS. 2A through 2Q are diagrams showing a method of fabricating the conventional field emission display device of FIG. 1.
Figure 2B:
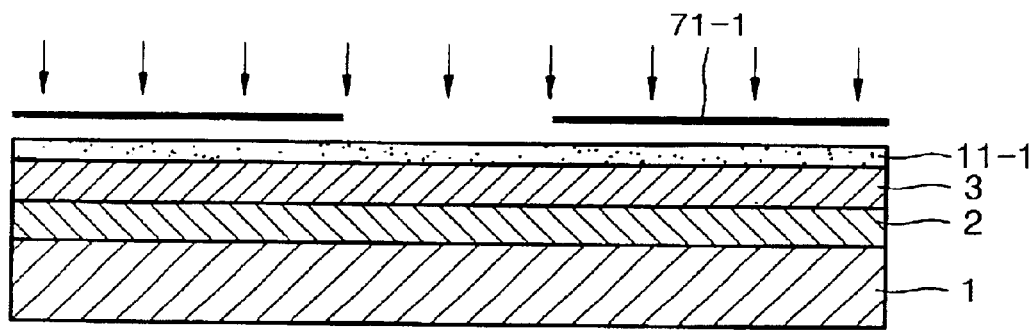
Figure 2C:
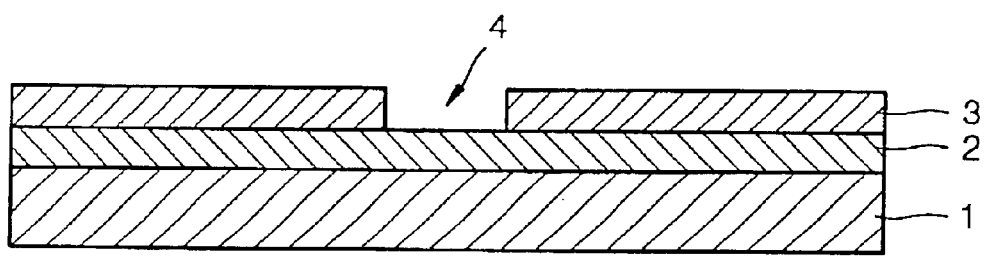
Figure 2D:
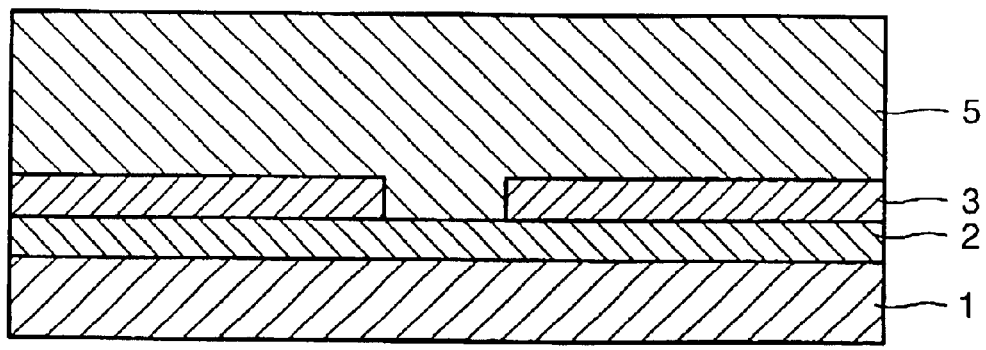
Figure 2E:
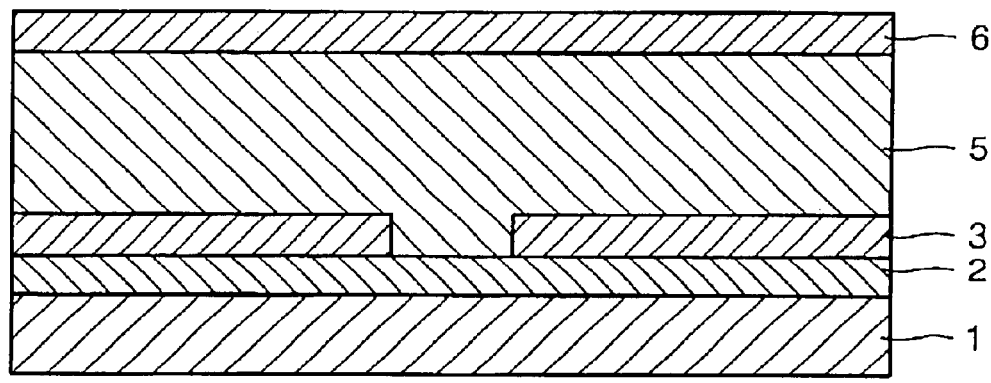
Figure 2F:
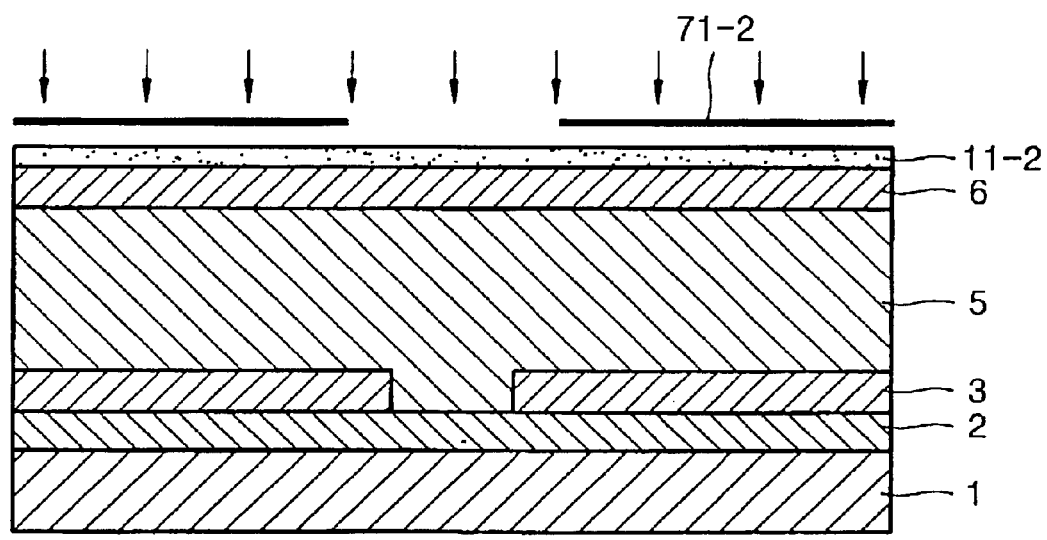
Figure 2G:
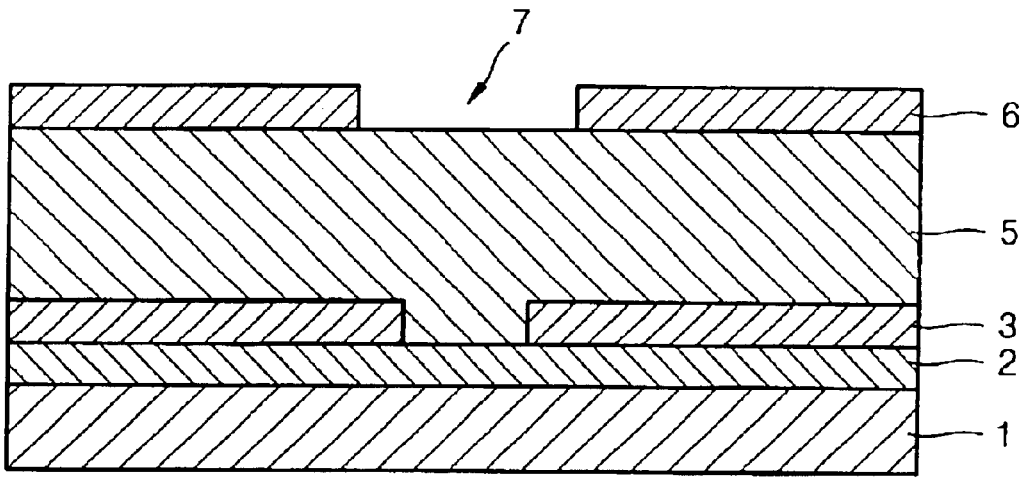
Figure 2H:
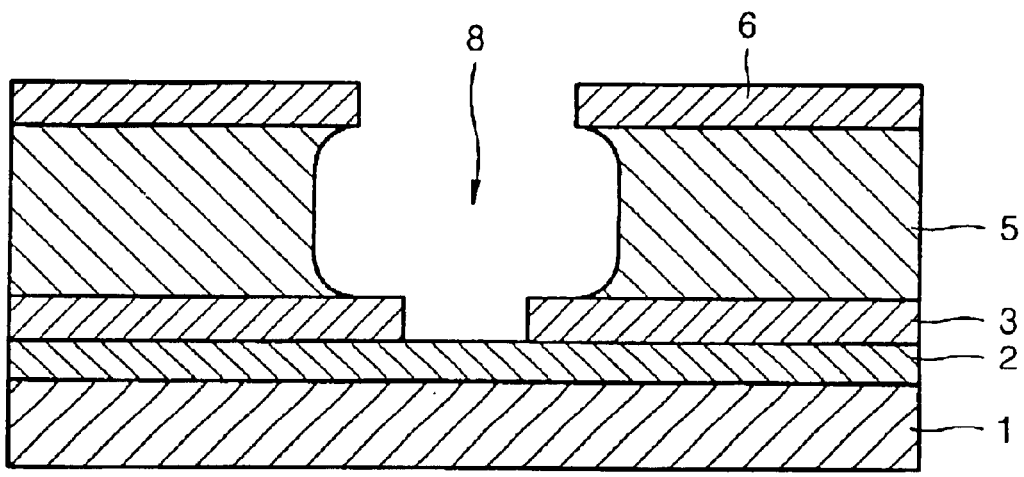
Figure 2I:
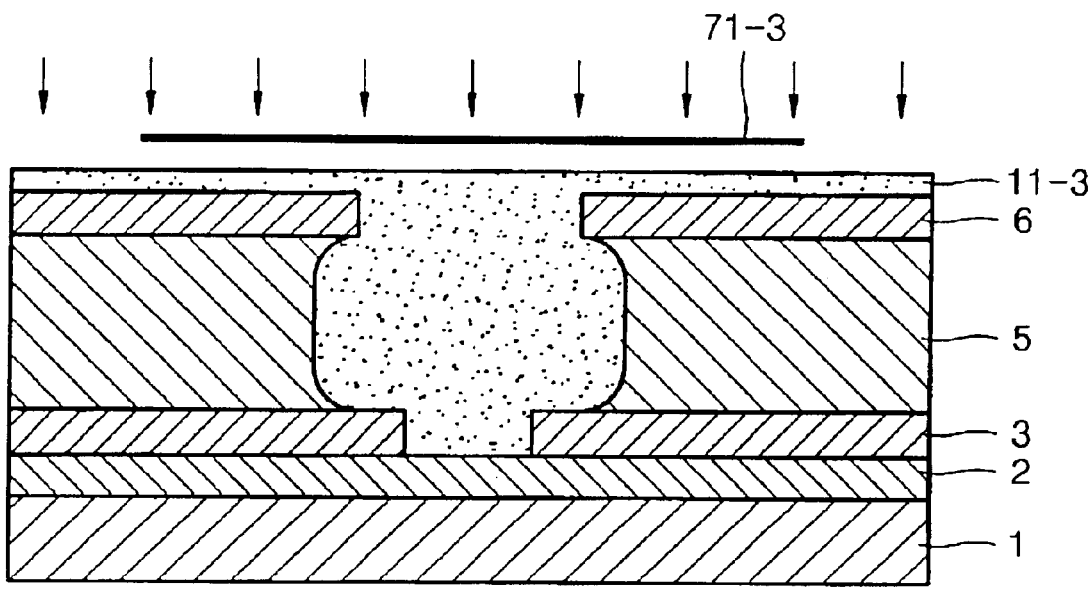
Figure 2J:
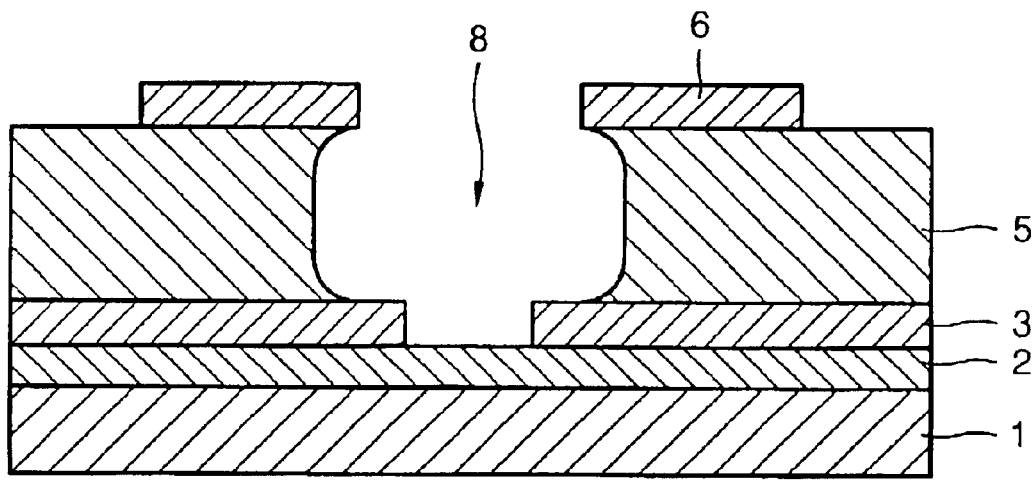
Figure 2K:
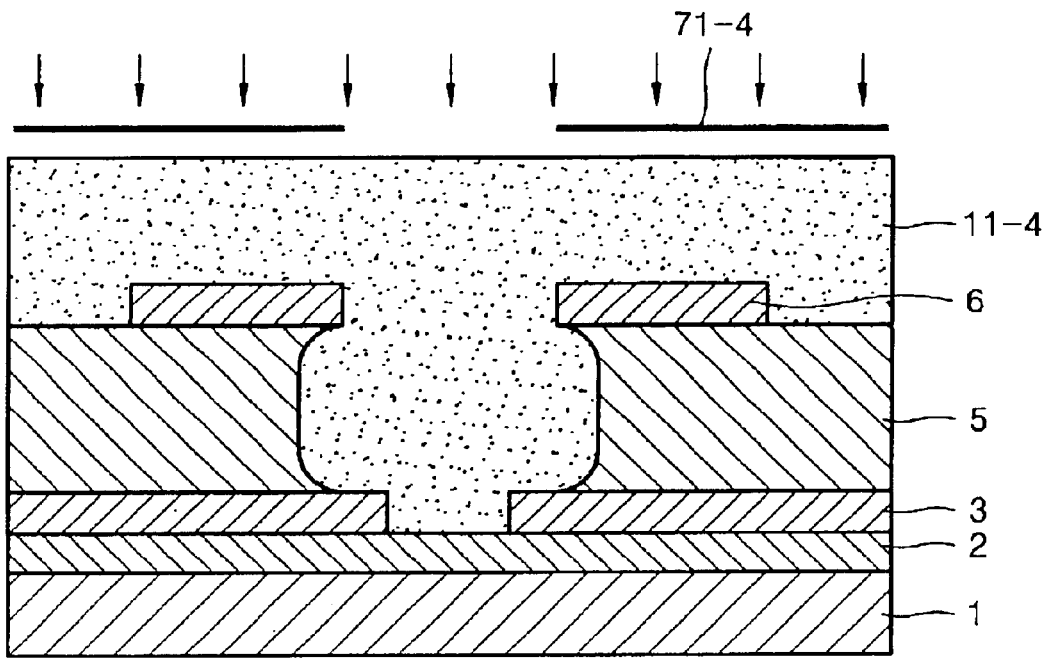
Figure 2L:
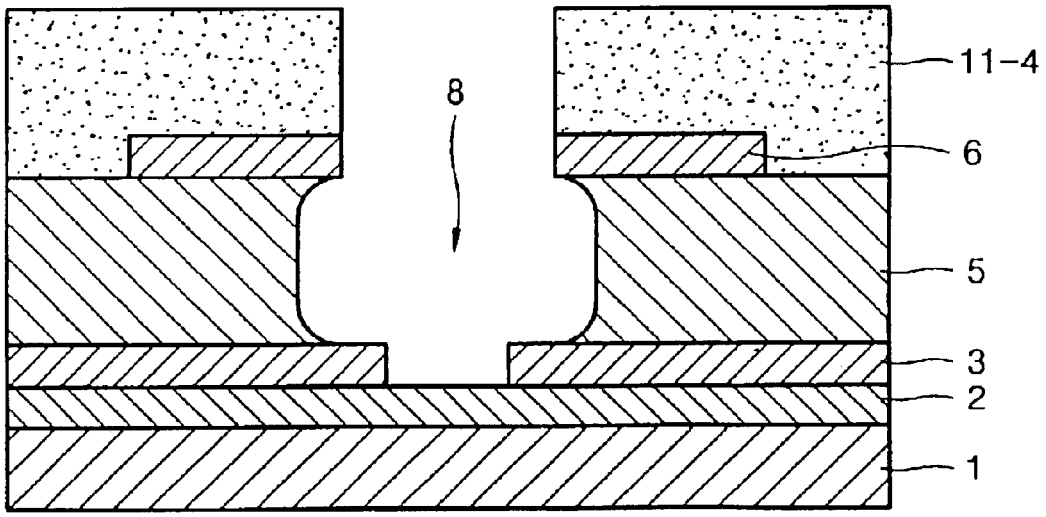
Figure 2M:
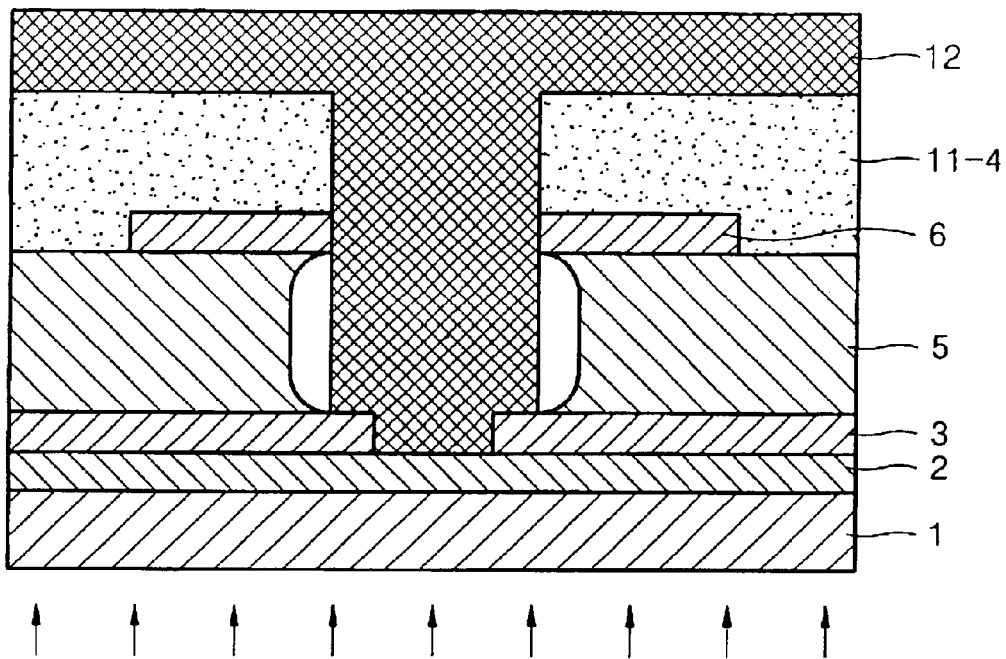
Figure 2N:
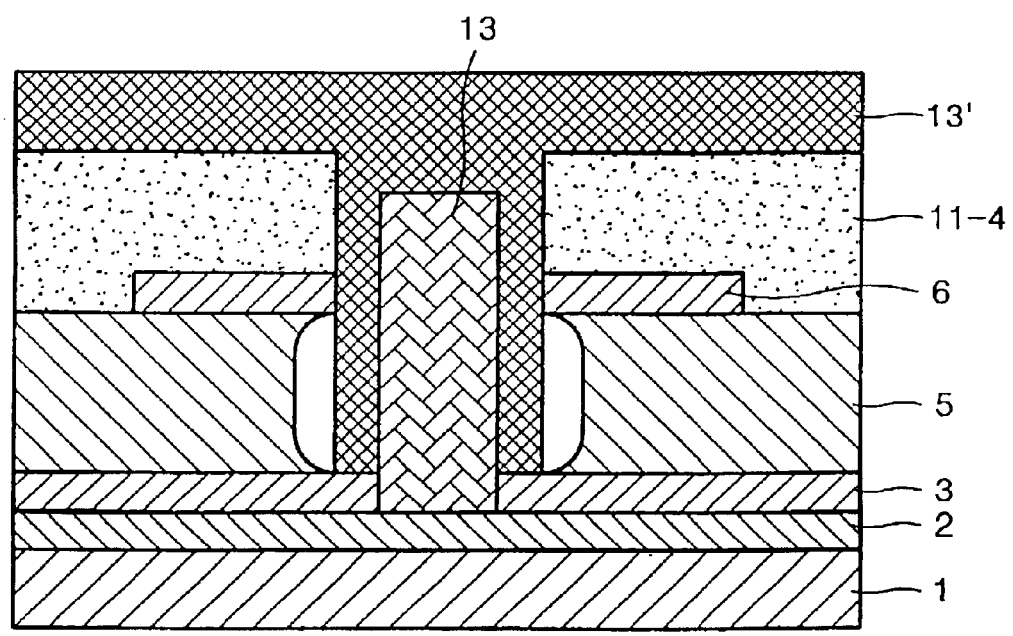
Figure 2O:
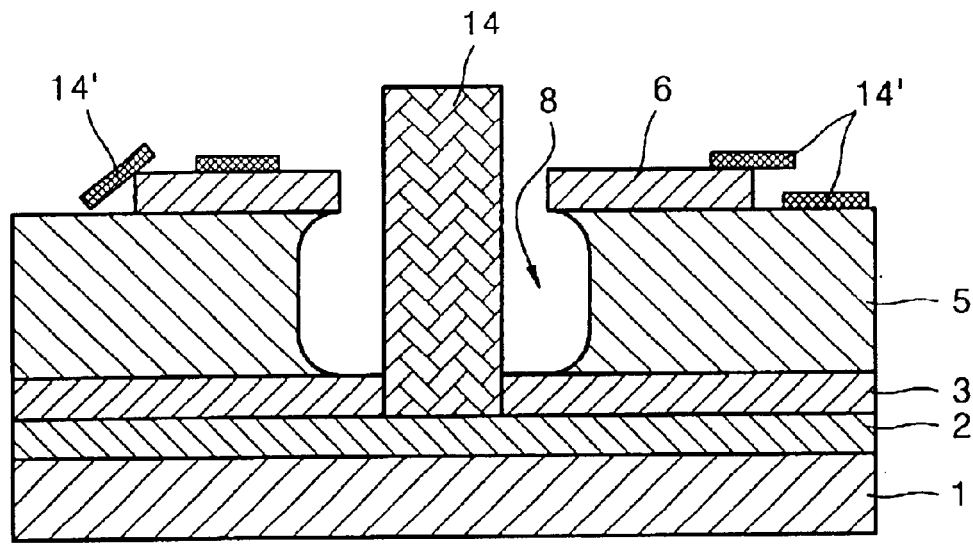
Figure 2P:
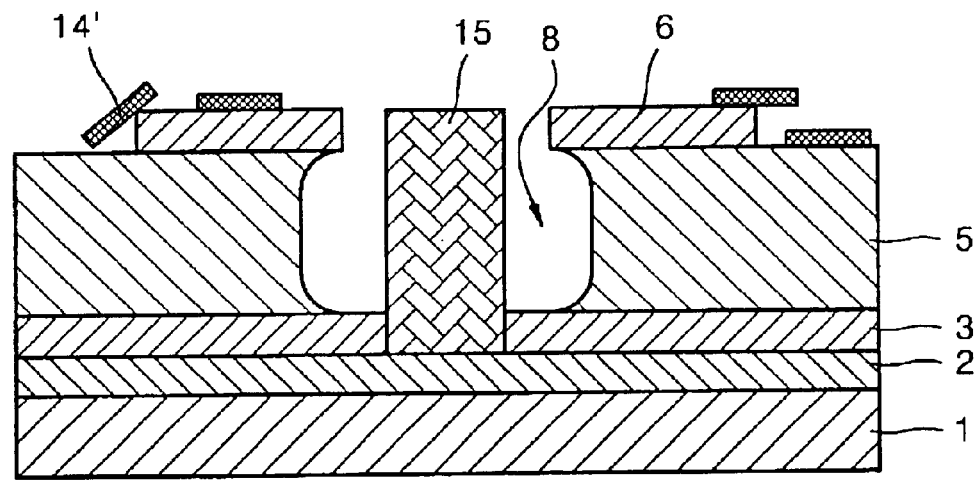
Figure 2Q:
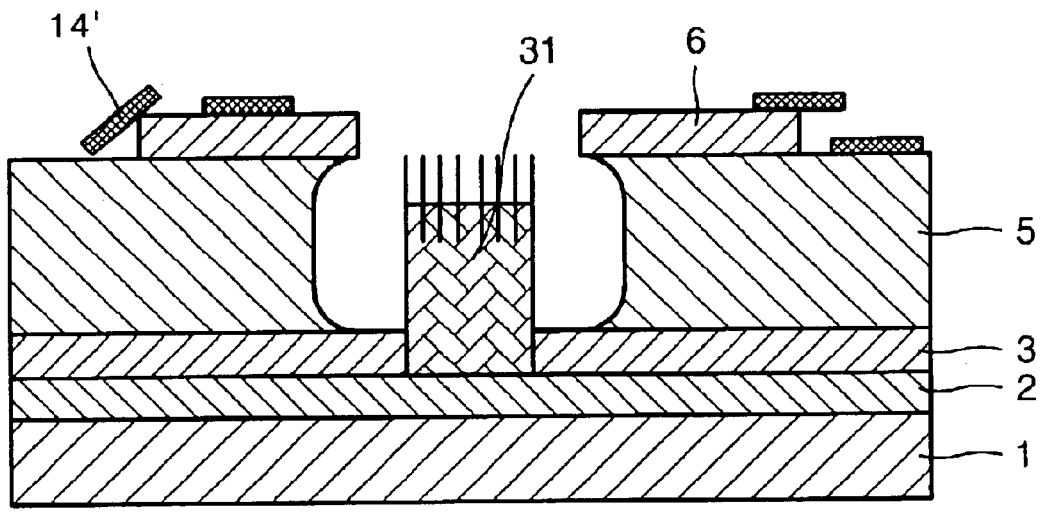
Figure 7A:
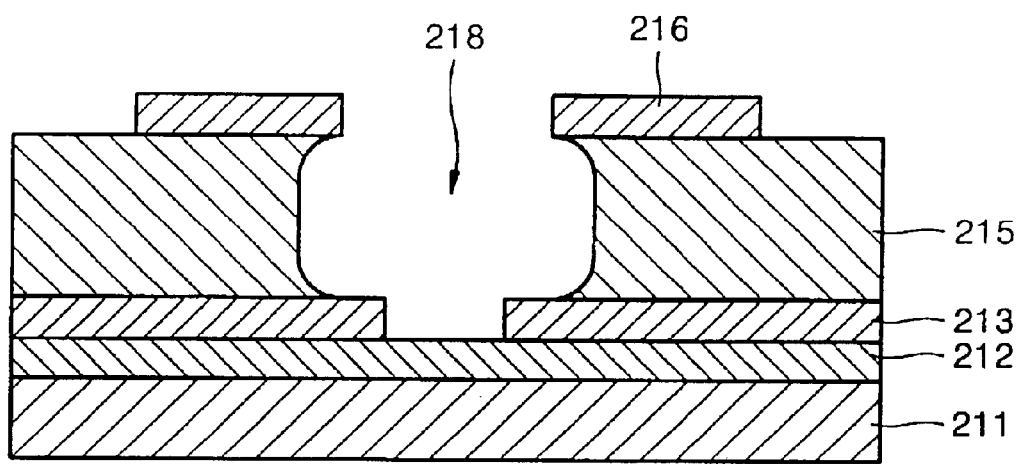
FIGS. 7A through 7H are diagrams of a method of fabricating a field emission display device according to a second embodiment of the present invention.

FIG. 7A shows a triode structure of a conventional field emission display device as shown in FIG. 2J. Reference numeral 211 denotes a substrate. Reference numeral 212 denotes an ITO electrode layer. Reference numeral 213 denotes a mask cathode layer. Reference numeral 215 denotes an insulation layer. Reference numeral 216 denotes a gate electrode. Reference numeral 218 denotes a well.

Figure 7B:
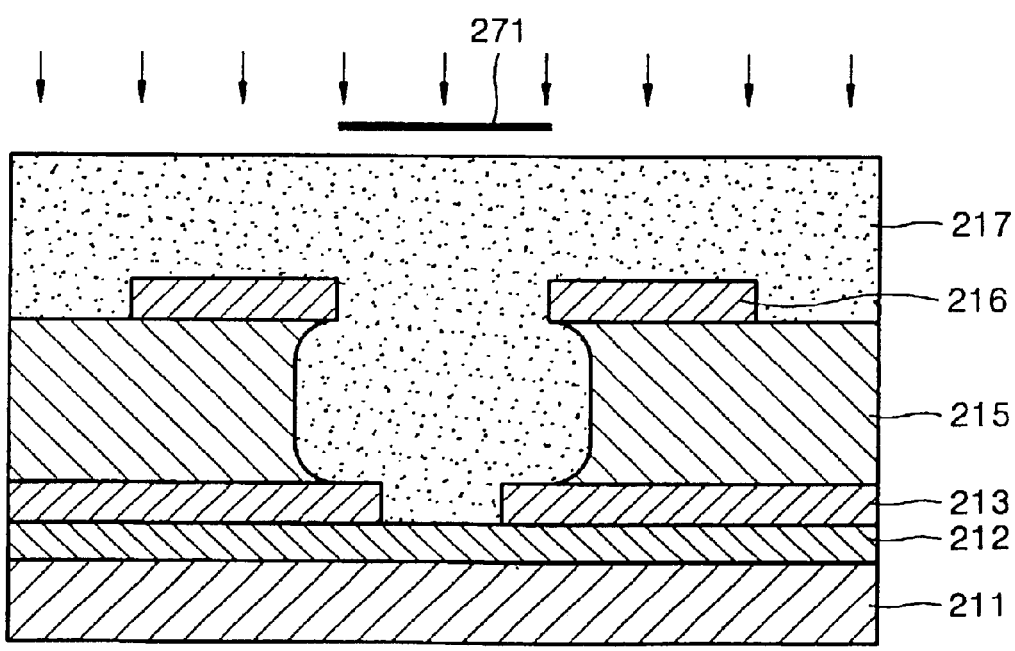
Figure 7C:
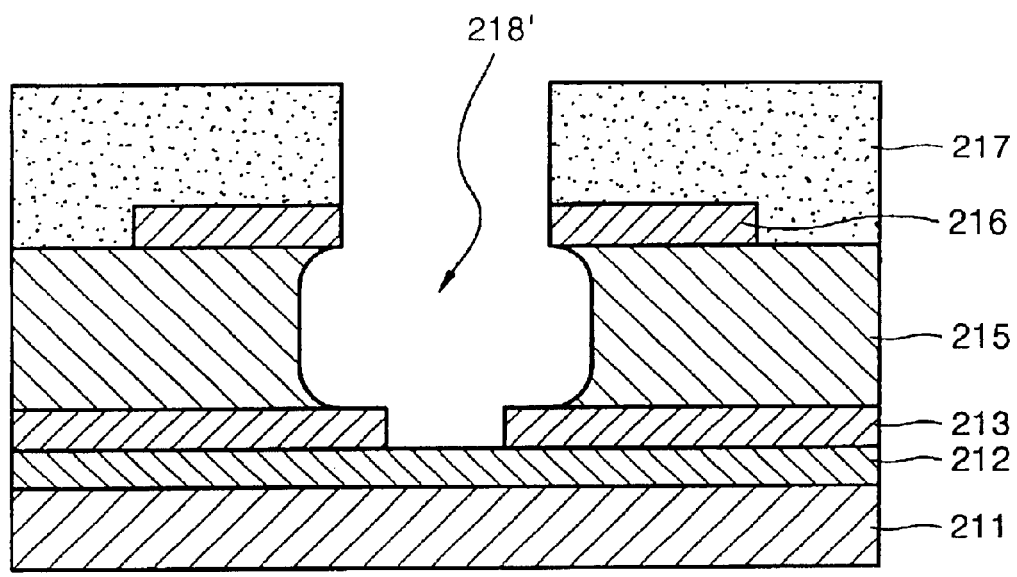

As shown in FIG. 7B, a material such as a dry film release (DFR) film which is a kind of photoresist and remains during developer treatment is deposited to cover the insulation layer 215 and the gate electrode 216, thereby forming a protective layer 217, and a mask 271 is disposed on the protective layer 217. Then, the protective layer 217 is patterned by a photoprocess including exposure and development, thereby forming a well 218', as shown in FIG. 7C.

Figure 7D:
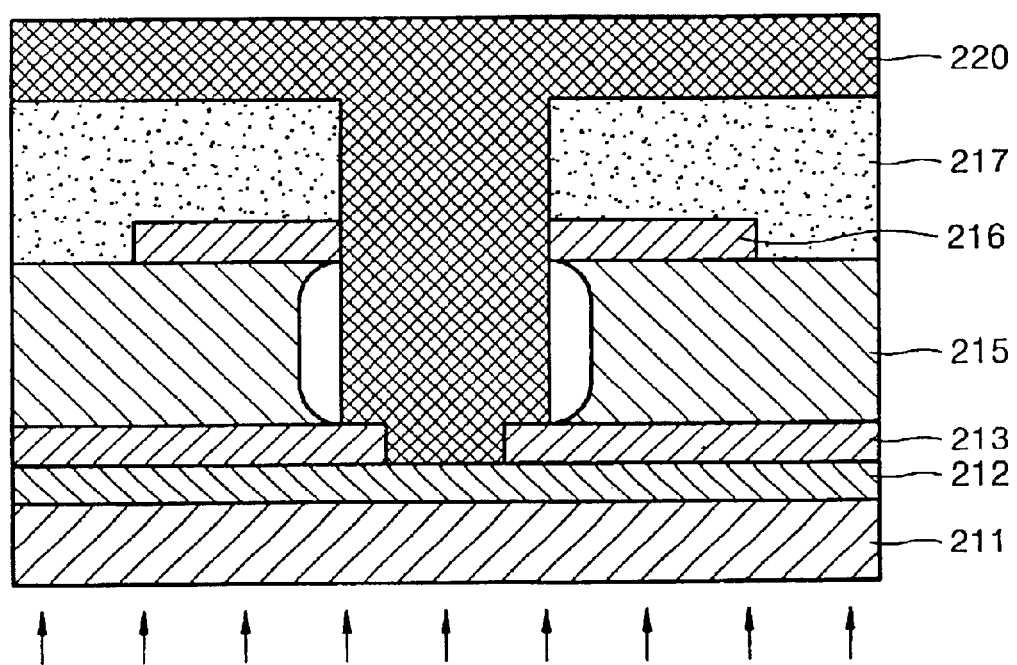

After the patterning process, as shown in FIG. 7D, carbon nanotube paste 220 is injected into the well 218 and is deposited on the protective layer 217.

Figure 7E:
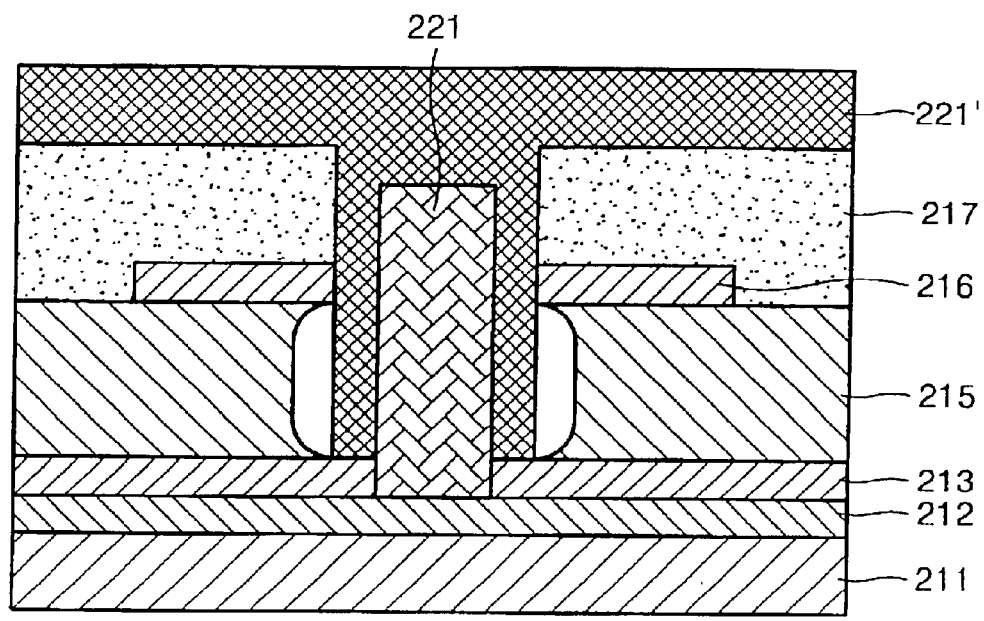

After the deposition of the carbon nanotube paste 220, rear exposure is performed by radiating ultraviolet rays at the rear of the substrate 211. Then, the ultraviolet rays are blocked by the mask cathode layer 213, so carbon nanotube paste 221' and the protective layer 217 are not exposed to the ultraviolet rays; and the ultraviolet rays pass through only the ITO electrode layer 212 from which the mask cathode layer 213 is etched, so carbon nanotube paste 221 is exposed to the ultraviolet rays, as shown in FIG. 7E.

Figure 7F:
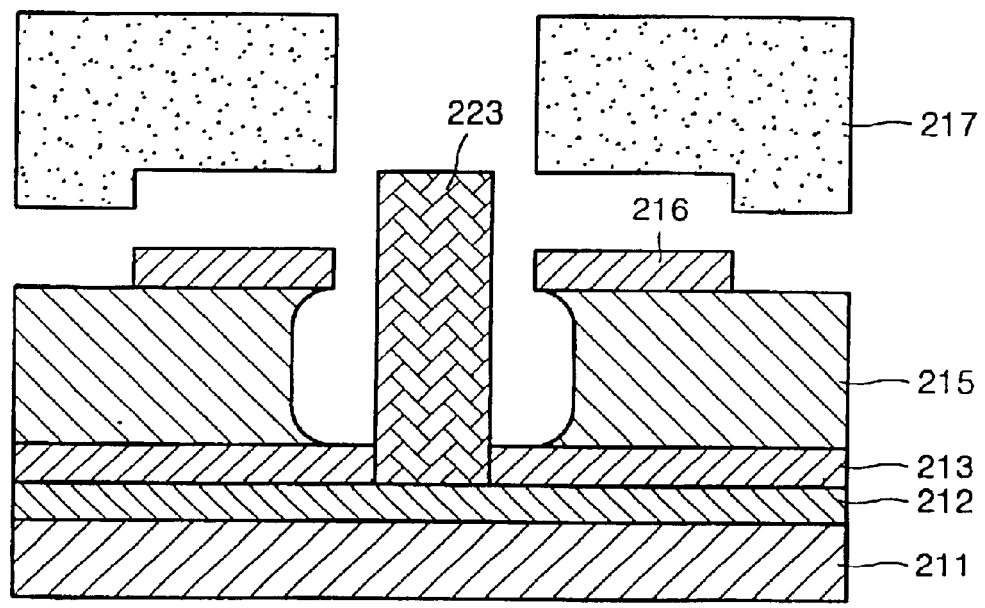

Thereafter, as shown in FIG. 7F, if development using a developer (for example, a $Na_2CO_3$ solution) is performed, the non-exposed carbon nanotube paste 221' is removed, and the protective layer 217 formed of a DFR film remains. A 4% NaOH solution is used to lift off the protective layer 217. The protective layer 217 formed of a DFR film does not dissolve in the NaOH solution and is lifted off from the surface of the substrate 11 with its shape maintained, thereby preventing residue of carbon nanotube within the solution from remaining. FIG. 7F shows a procedure of lifting off the protective layer 217 from the gate electrode 216.

Here, instead of separately removing the non-exposed carbon nanotube paste 221' and the protective layer 217, the non-exposed carbon nanotube paste 221' and the protective layer 217 can be simultaneously lifted off from the exposed carbon nanotube paste 221 and the gate electrode 216 by using a NaOH solution in step shown in FIG. 7F. This is possible because the non-exposed carbon nanotube paste 221' is chemically combined with the protective layer 217 and the protective layer 217 is formed of film-type DFR. In a conventional case using liquid photoresist, non-exposed carbon nanotube paste and photoresist are dispersed within a developer and do not chemically combined with each other, so such simultaneous lift-off is impossible.

A DFR film is used for a protective layer in the second embodiment of the present invention, but any material which chemically combines with carbon nanotube paste and remains in a solid form within a developer so as to be completely lifted off from a triode structure can be used for the protective layer.

The residue of carbon nanotube paste occurs in the conventional art because non-exposed carbon nanotube paste and photoresist used as a sacrificial layer are dispersed within a developer during a lift-off process and the carbon nanotube paste at the top of a cathode is exposed to the developer. To overcome these problems, in the present invention, a DFR film which chemically combines with non-exposed carbon nanotube paste is formed as a protective layer so as to prevent the dispersion of the non-exposed carbon nanotube paste within a developer, thereby protecting a gate electrode layer during a lift-off process. In addition, by using the DFR film, exposed carbon nanotube paste can be prevented from directly contacting the developer. Accordingly, a method of fabricating a field emission display device according to the second embodiment of the present invention prevents non-exposed carbon nanotube paste from remaining.

Figure 7G:
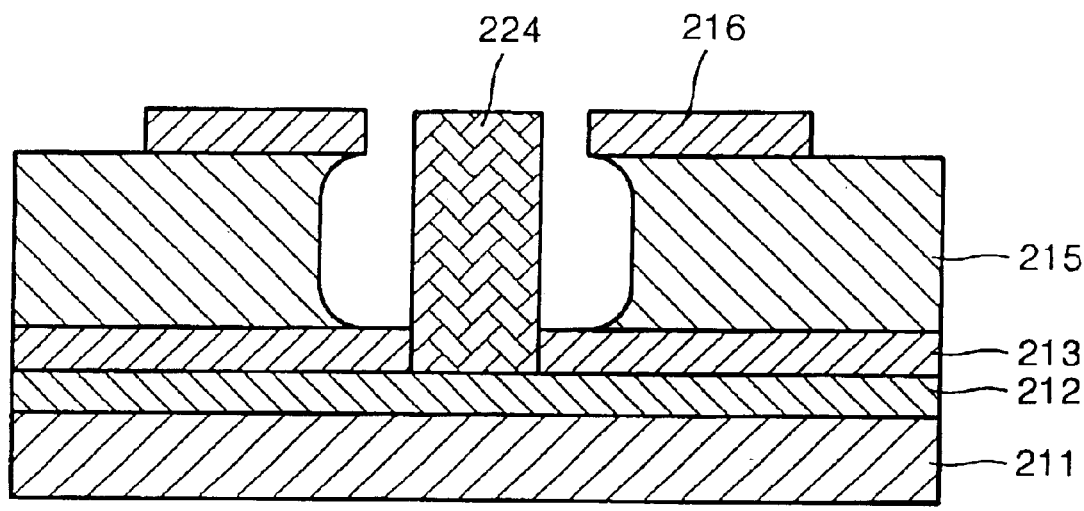
Figure 7H:
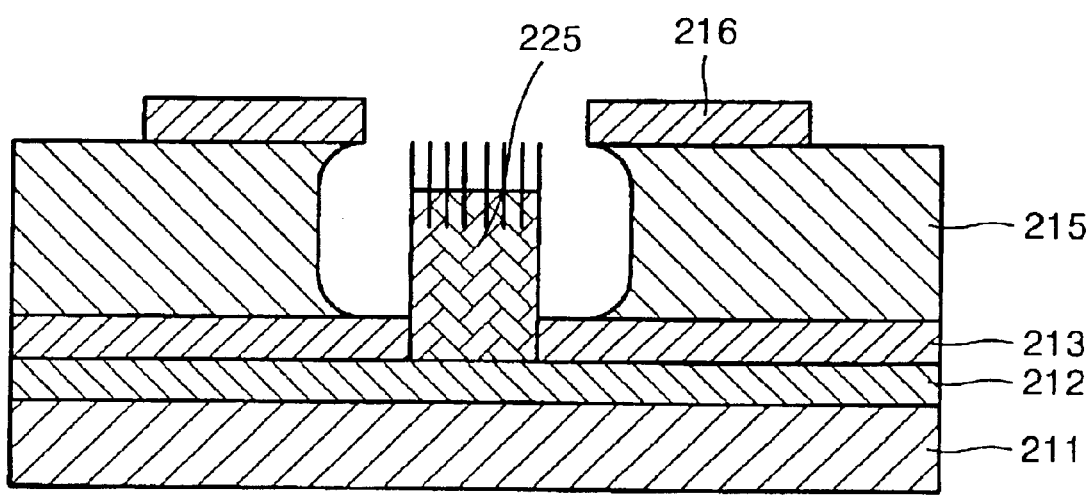

After the lift-off process, a firing process is performed, thereby forming low carbon nanotube column 224, as shown in FIG. 7G. Thereafter, a surface treatment is performed, thereby completing a field emission display device having needle-type carbon nanotube tips functioning as an electron emitting source, as shown in FIG. 7H.

A method of fabricating a field emission display device according to the second embodiment of the present invention can be applied to a triode structure according to a method of fabricating a field emission display device according to the first embodiment of the present invention shown in FIG. 5K as well as a conventional triode structure shown in FIG. 2J.

More specifically, after a protective layer made of a DFR film is patterned to be deposited on the resistance layer 120, which is formed to block ultraviolet rays, in FIG. 5K, the processes shown in FIGS. 7D through 7H are performed, thereby fabricating the field emission display device shown in FIG. 5R. Here, the difference between the first and second embodiments is that a field emission display device fabricated according to the first embodiment of the present invention includes a resistance layer instead of a mask cathode layer in order to block ultraviolet rays.

A method of fabricating a field emission display device according to the second embodiment of the present invention prevents carbon nanotube paste from remaining during development of the carbon nanotube paste, thereby protecting the surface of a cathode. Accordingly, short circuit between electrodes or diode emission can be prevented.

Figure 8:
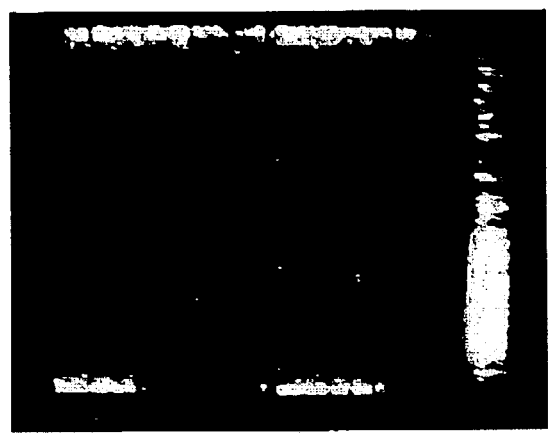
FIG. 8 is a photograph of electron emission in the case where liquid photoresist is used as a sacrificial layer in a method of fabricating a field emission display device according to the second embodiment of the present invention.
Figure 9:
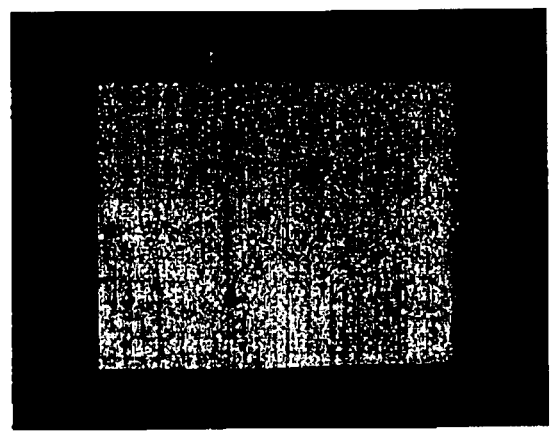
FIG. 9 is a photograph of electron emission in the case where a dry film release (DFR) film is used as a sacrificial layer in a method of fabricating a field emission display device according to the second embodiment of the present invention.

FIG. 8 is a photograph of electron emission in the case where liquid photoresist is used as a sacrificial layer in a method of fabricating a field emission display device according to the second embodiment of the present invention, and FIG. 9 is a photograph of electron emission in the case where a DFR film is used as a sacrificial layer in a method of fabricating a field emission display device according to the second embodiment of the present invention.

The photograph of FIG. 9 is brighter than the photograph of FIG. 8, so it can be inferred that the residue of carbon nanotube paste is more effectively removed in the case of using the DFR film as the sacrificial layer than in the case of using the liquid photoresist as the sacrificial layer.

An apparatus and method for fabricating a field emission display device according to the present invention are advantageous in removing an alignment error between a gate electrode and a cathode by performing a high-temperature firing process after depositing an insulation layer, thereby preventing current leakage and improving electron emission.

Moreover, a method of fabricating a field emission display device according to the present invention is advantageous in preventing short circuit between electrode or diode emission by preventing carbon nanotube paste from remaining during development.

What is claimed is:

1. A field emission display device comprising:
    a substrate;
    a transparent cathode layer which is deposited on the substrate;
    an insulation layer which is formed on the cathode layer and has a well exposing the cathode layer;
    a gate electrode which is formed on the insulation layer and has an opening corresponding to the well;
    a resistance layer which is formed to surround the surface of the gate electrode and the inner walls of the opening and the well so as to block light; and
    a carbon nanotube field emitting source which is positioned on the exposed cathode layer.

2. The field emission display device of claim 1, wherein the resistance layer is made of amorphous silicon.

3. The field emission display device of claim 1, wherein the carbon nanotube field emitting source comprises a carbon nanotube column positioned on the exposed cathode layer and carbon nanotube tips protruding from the surface of the carbon nanotube column.

4. A method of fabricating a field emission display device, comprising:
    (a) sequentially forming a transparent cathode layer and an insulation layer on a substrate and performing firing;
    (b) forming a gate electrode on the insulation layer and patterning the gate electrode to form an opening at the center thereof;
    (c) etching the insulation layer to form a well corresponding to the opening and patterning the gate electrode in a strip shape;
    (d) depositing a resistance layer for blocking light on the surface of the gate electrode and the inner wall of the well and patterning the resistance layer to expose the cathode layer at the bottom of the well; and
    (e) forming a carbon nanotube field emitting source on the exposed cathode layer.

5. The method of claim 4, wherein the resistance layer is formed of amorphous silicon.

6. The method of claim 5, wherein in step (d), the resistance layer is formed by chemical vapor deposition.

7. The method of claim 4, wherein the carbon nanotube field emitting source comprises a carbon nanotube column positioned on the exposed cathode layer and carbon nanotube tips protruding from the surface of the carbon nanotube column.

* * * * *